US011404702B2

(12) United States Patent
Steinbach et al.

(10) Patent No.: US 11,404,702 B2
(45) Date of Patent: Aug. 2, 2022

(54) CATALYST COMPRISING PT, NI, AND CR

(71) Applicant: 3M INNOVATIVE PROPERTIES COMPANY, St. Paul, MN (US)

(72) Inventors: Andrew J. L. Steinbach, Shoreview, MN (US); Amy E. Hester, Hudson, WI (US); Andrew T. Haug, Woodbury, MN (US); Krzysztof A. Lewinski, Mahtomedi, MN (US); Sean M. Luopa, Minneapolis, MN (US); Grant M. Thoma, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/733,645

(22) PCT Filed: Mar. 27, 2019

(86) PCT No.: PCT/IB2019/052499
§ 371 (c)(1),
(2) Date: Sep. 24, 2020

(87) PCT Pub. No.: WO2019/193461
PCT Pub. Date: Oct. 10, 2019

(65) Prior Publication Data
US 2021/0013522 A1    Jan. 14, 2021

Related U.S. Application Data

(60) Provisional application No. 62/652,624, filed on Apr. 4, 2018.

(51) Int. Cl.
*H01M 4/92*    (2006.01)
*H01M 4/86*    (2006.01)
(Continued)

(52) U.S. Cl.
CPC ......... *H01M 4/921* (2013.01); *H01M 4/8657* (2013.01); *H01M 4/9041* (2013.01); *H01M 8/1004* (2013.01); *H01M 2008/1095* (2013.01)

(58) Field of Classification Search
None
See application file for complete search history.

(56) References Cited

U.S. PATENT DOCUMENTS 4,340,276 A    7/1982  Maffitt
4,447,506 A    5/1984  Luczak
(Continued)

FOREIGN PATENT DOCUMENTS

CN    102820475    2/2016
EP    2959968      12/2015
(Continued)

OTHER PUBLICATIONS

Artem, "Development of Ternary and Quaternary Catalysts for The Electrooxidation of Glycerol", The Scientific World Journal, 2012, vol. 2012, Article ID 502083, 6 pages.
(Continued)

*Primary Examiner* — Daniel S Gatewood
(74) *Attorney, Agent, or Firm* — Lynn R. Hunsberger (57) ABSTRACT

Catalysts comprising nanostructured elements comprising microstructured whiskers having an outer surface at least partially covered by a catalyst material comprising at least 90 atomic percent collectively Pt, Ni, and Cr, wherein the Pt is present in a range from 32.4 to 35.8 atomic percent, the Ni is present in a range from 57.7 to 63.7 atomic percent, and the Cr is present in a range from 0.5 to 10.0 atomic percent, and wherein the total atomic percent of Pt, Ni, and Cr equals 100. Catalyst described herein are useful, for example, in fuel cell membrane electrode assemblies.

13 Claims, 3 Drawing Sheets

(51) Int. Cl.
  *H01M 4/90* (2006.01)
  *H01M 8/1004* (2016.01)
  *H01M 8/10* (2016.01)

(56) References Cited

U.S. PATENT DOCUMENTS

| | | |
|---|---|---|
| 4,568,598 A | 2/1986 | Bilkadi |
| 4,812,352 A | 3/1989 | Debe |
| 5,039,561 A | 8/1991 | Debe |
| 5,068,161 A | 11/1991 | Keck |
| 5,183,713 A | 2/1993 | Kunz |
| 5,338,430 A | 8/1994 | Parsonage |
| 5,759,944 A | 6/1998 | Buchanan |
| 5,879,827 A | 3/1999 | Debe |
| 5,879,828 A | 3/1999 | Debe |
| 6,040,077 A | 3/2000 | Debe |
| 6,136,412 A | 10/2000 | Spiewak |
| 6,319,293 B1 | 11/2001 | Debe |
| 6,805,972 B2 | 10/2004 | Erlebacher |
| 7,419,741 B2 | 9/2008 | Strom |
| 7,901,829 B2 | 3/2011 | Debe |
| 8,211,825 B2 | 7/2012 | Mei |
| 8,673,773 B2 | 3/2014 | Opperman |
| 8,748,330 B2 | 6/2014 | Debe |
| 8,895,206 B2 | 11/2014 | Erlebacher |
| 2002/0004453 A1 | 1/2002 | Haugen |
| 2004/0048466 A1 | 3/2004 | Gore |
| 2005/0053826 A1 | 3/2005 | Wang |
| 2006/0251952 A1* | 11/2006 | Chondroudis ........ H01M 4/925 502/180 |
| 2007/0082814 A1* | 4/2007 | Debe ................... B01J 23/8986 502/324 |
| 2010/0047668 A1 | 2/2010 | Steinbach |
| 2014/0246304 A1 | 9/2014 | Debe |
| 2015/0093685 A1 | 4/2015 | Yang |
| 2015/0311536 A1 | 10/2015 | Atanasoska |
| 2015/0380758 A1 | 12/2015 | Ball |
| 2016/0079604 A1 | 3/2016 | Atanasoski |
| 2018/0062181 A1 | 3/2018 | Gath |

FOREIGN PATENT DOCUMENTS

| | | |
|---|---|---|
| EP | 2954579 | 4/2018 |
| EP | 2843066 | 8/2019 |
| JP | H03-236160 | 10/1991 |
| JP | H06-132034 | 5/1994 |
| JP | 2010-280974 | 12/2010 |
| JP | 2011-014475 | 1/2011 |
| WO | WO 2001-048839 | 7/2001 |
| WO | WO 2008-025750 | 3/2008 |
| WO | WO 2009-135189 | 11/2009 |
| WO | WO 2010-092369 | 8/2010 |
| WO | WO 2010-138138 | 12/2010 |
| WO | WO 2012-017226 | 2/2012 |
| WO | WO 2012-107738 | 8/2012 |
| WO | WO 2013-055533 | 4/2013 |
| WO | WO 2014-099790 | 6/2014 |
| WO | WO 2014-122426 | 8/2014 |
| WO | WO 2014-122427 | 8/2014 |
| WO | WO 2016-100034 | 6/2016 |
| WO | WO 2016-191057 | 12/2016 |
| WO | WO 2018-080791 | 5/2018 |
| WO | WO 2019-193458 | 10/2019 |
| WO | WO 2019-193460 | 10/2019 |
| WO | WO 2019-195046 | 10/2019 |
| WO | WO 2019-198029 | 10/2019 |
| WO | WO 2019-198031 | 10/2019 |
| WO | WO 2019-198033 | 10/2019 |

OTHER PUBLICATIONS

Arun, "Electrochemical Characterization of Pt—Ru—Ni/C Anode Electrocatalyst for Methanol Electrooxidation in Membraneless Fuel Cells," RSC Advances, Jun. 2015, vol. 5, pp. 49643-49650.

Cheng, "Enhanced Activity and Stability of Core-Shell Structured PtRuNi$_x$ Electrocatalysts for Direct Methanol Fuel Cells," International Journal of Hydrogen Energy, Jan. 2016, vol. 41, No. 3, pp. 1935-1943.

Chessin, "Paramagnetic Susceptibility, Electrical Resistivity, and Lattice Parameters of Nickel-Rich Nickel-Tantalum Alloys," Journal of Applied Physics, Aug. 1964, vol. 35 No. 8, pp. 2419-2423.

Choi, "Methanol Oxidation on Pt/Ru, Pt/Ni, and Pt/Ru/Ni Anode Electrocatalysts at Different Temperatures for DMFCs" Journal of the Electrochemical Society, 2003, vol. 150, No. 7, pp. A973-A978.

Chow, "Fabrication of Biologically Based Microstructure Composites for Vacuum Field Emission", Materials Science and Engineering, A158, Oct. 1992, vol. 158, No. 1, pp. 1-6.

Clancey, "Atomic Layer Deposition of Ultrathin Platinum Films on Tungsten Atomic Layer Deposition Adhesion Layers: Application to High Surface Area Substrates," Journal of Vacuum Science and Technology, Part A, Jan. 1901, vol. 33, No. 1, 9 pages.

Cooper, "Combinatorial screening of fuel cell cathode catalyst compositions", Applied Surface Science, 254, 2007, pp. 662-668.

Debe, "Effect of Gravity on Copper Phthalocyanine Thin Films III: Microstructure Comparisons of Copper Phthalocyanine Thin Films Grown in Microgravity and Unit Gravity", Thin Solid Films, 186, 1990, pp. 327-347.

Debe, "Vacuum Vapor Deposited Thin Films of a Perylene Dicarboxide Derivative: Microstructure Versus Deposition Parameters", Journal of Vacuum Science & Technology A, vol. 6, No. 3, May/Jun. 1988, pp. 1907-1911.

Edwards, "Basic Materials Physics of Transparent Conducting Oxides," Dalton Transactions, 2004, vol. 19, pp. 2995-3002.

Erlebacher, "Evolution of Nanoporosity in Dealloying", Letters to Nature, Mar. 2001, vol. 410, pp. 450-453.

Gerstenberg "Effects of Nitrogen, Methane, and Oxygen on Structure and Electrical Properties of Thin Tantalum Films," Journal of Applied Physics, Feb. 1964, vol. 35, No. 2, pp. 402-407.

Hitosugi, Ta-doped Anatase TiO2 Epitaxial Film as Transparent Conducting Oxide, Japanese Journal of Applied Physics, 2005, vol. 44, No. 34, pp. L1063-L1065.

Hu, "A Facile and Surfactant-Free Route for Nanomanufacturing of Tailored Ternary Nanoalloys as Superior Oxygen Reduction Reaction Electrocatalysts", Catalysis Science & Technology, Apr. 2017, vol. 7. No. 10, pp. 2074-2086.

Ioroi, "Platinum-Iridium Alloys as Oxygen Reduction Electrocatalysts for Polymer Electrolyte Fuel Cells", Journal of The Electrochemical Society, 2005, vol. 152, No. 10, pp. A1917-A1924.

Johnson, "In Situ Reactivity and TOF-SIMS Analysis of Surfaces Prepared by Soft and Reactive Landing of Mass-Selected Ions", Analytical Chemistry, 2010, vol. 82, No. 13, pp. 5718-5727.

Johnson, "Preparation of Surface Organometallic Catalysts by Gas-Phase Ligand Stripping and Reactive Landing of Mass-Selected Ions", Chemistry: A European Journal, 2010, vol. 16, No. 48, pp. 14433-14438.

Ju, Electrical Properties of Amorphous Titanium Oxide Thin Films for Bolometric Application, Advances in Condensed Matter Physics, Nov. 2013, Article ID 365475, 5 pages.

Kam "Summary Abstract: Dramatic Variation of the Physical Microstructure of a Vapor Deposited Organic Thin Film", Journal of Vacuum Science & Technology A, vol. 5, No. 4, Jul./Aug. 1987, pp. 1914-1916.

Kim, "High-Performance Quaternary PtRuIrNi Electrocatalysts with Hierarchical Nanostructured Carbon Support," Journal of Catalysis, Oct. 2013, vol. 306, pp. 133-145.

Lee, "Measurement and Modeling of the Reflectance-Reducing Properties of Gradient Index Microstructured Surfaces", Photographic Science and Engineering, vol. 24, No. 4, Jul./Aug. 1980, pp. 211-216.

Lewinski, "NSTF Advances for PEM Electrolysis—the Effect of Alloying on Activity of NSTF Electrolyzer Catalysts and Performance of NSTF Based PEM Electrolyzers", ECS Transactions, Oct. 2015, vol. 69, No. 17, pp. 893-917.

Li, "Preparation and Electrochemical Research of Anode Catalyst PtRuNi/C for Direct Methanol Fuel Cell," Journal of Biobased Materials and Bioenergy, Aug. 2013, vol. 7, No. 4, pp. 525-528.

(56) References Cited

OTHER PUBLICATIONS

Liang, "Synthesis and Structure-Activity Relationship Exploration of Carbon-Supported PtRuNi Nanocomposite as a CO-Tolerant Electrocatalyst for Proton Exchange Membrane Fuel Cells", Journal of Physical Chemistry B, Mar. 2006, vol. 110, No. 15, pp. 7828-7834.
Liu, "Methanol Oxidation on Carbon-Supported Pt—Ru—Ni Ternary Nanoparticle Electrocatalysts," Journal of Power Sources, Jan. 2008, vol. 175, No. 1, pp. 159-165.
Liu, "Segmented Pt/Ru, Pt/Ni, and Pt/RuNi Nanorods as Model Bifunctional Catalysts for Methanol Oxidation," Small, Jan. 2006, vol. 2, No. 1, pp. 121-128.
Liu, "RDE Measurements of ORR Activity of $Pt_1 - xIr_x$ (0 < x < 0.3) on High Surface Area NSTF-Coated Glassy Carbon Disks," Journal of the Electrochemical Society, 2010, vol. 157, No. 2, pp. B207-B214.
Mani, "Dealloyed Binary $PtM_3$ (M=Cu. Co, Ni) and Ternary PtNi3M (M=Cu, Co, Fe, Cr) Electrocatalysts for the Oxygen Reduction Reaction: Performance in Polymer Electrolyte Membrane fuel Cells", Journal of Power Sources, Jan. 2011, vol. 196, No. 2, pp. 666-673.
Martinez-Huerta, "Effect of Ni Addition Over PtRu/C Based Electrocatalysts for Fuel Cell Applications," Applied Catalysis B: Environmental, Dec. 2006, vol. 69, No. 1-2, pp. 75-84.
Moreno, "Synthesis of the Ceramic-Metal Catalysts (PtRuNi—TiO2) by the Combustion Method," Journal of Power Sources, Jun. 2007, vol. 169, No. 1, pp. 98-102.
Nan, "A Core-Shell $Pd_{1\ Ru1\ Ni2}$@Pt/C Catalyst with a Ternary Alloy Core and Pt Monolayer: Enhanced Activity and Stability Towards the Oxygen Reduction Reaction by the Addition of Ni," Journal of Materials Chemistry A, 2016, vol. 4, No. 3, pp. 847-855.
Ohnuma, "Amorphous Ultrafine Metallic Particles Prepared By Sputtering Method", Rapidly Quenched Metals, (Proc. of the Fifth Int. Conf. on Rapidly Quenched Metals, Wurzburg, Germany, Sep. 3-7, 1984), S. Steeb et al., eds., Elsevier Science Publishers B. V., New York, (1985), pp. 1117-1124.
Palma, "Development of Plurimetallic Electrocatalysts Prepared by Decomposition of Polymeric Precursors for $EtOH/O_2$ Fuel Cell," Journal of the Brazilian Chemical Society, Mar. 2012, vol. 23, No. 3, pp. 555-564.
Palma, "Ethanol Electrooxidation by Plurimetallic Pt-Based Electrocatalysts Prepared by Microwave Assisted Heating," Journal of the Electrochemical Society, Feb. 2014, vol. 161, No. 4, pp. F473-F479.
Papaderakis, "Ternary Pt—Ru—Ni Catalytic Layers for Methanol Electrooxidation Prepared by Electrodeposition and Galvanic Replacement," Frontiers in Chemistry, Jun. 2014, vol. 2, Art. 29, pp. 1-11.
Park, "Chemical and Electronic Effects of Ni in Pt/Ni and Pt/Ru/Ni Alloy Nanoparticles in Methanol Electrooxidation," Journal of Physical Chemistry B, Feb. 2002, vol. 106, No. 8, pp. 1869-1877.
Paul, "Electrochemical Oxidation of Ethanol on Thin Coating of Platinum-Based Material on Nickel Support," Indian Journal of Chemistry, May 2006, vol. 45, pp. 1144-1152.
Pierson, "Handbook of Refractory Carbides and Nitrides", 1996, pp. 1-7.
Ribadeneira, "Co-Catalytic Effect of Nickel in Pt—Ru/C and Pt—Sn/C Electrocatalysts For Ethanol Electrooxidation," Latin American Applied Research, Apr. 2010, vol. 40, No. 2, pp. 113-118.
Sadaoka, "Effects of Morphology on NO2 Detection in Air at Room Temperature with Phthalocyanine Thin Films", Journal of Material Science, vol. 25, 1990, pp. 5257-5268.
Scott, "The Journal of the Institute of Metals", 1919, vol. XXI, p. 441.
Shao, "Evaluation of the Performance of Carbon Supported Pt—Ru—Ni—P as Anode Catalyst for Methanol Electrooxidation," Fuel Cells, 2010, vol. 10, No. 3, pp. 472-477.
Shen, "Comparison Study of Few-Layered Graphene Supported Platinum and Platinum Alloys for Methanol and Ethanol Electro-Oxidation," Journal of Power Sources, Mar. 2015, vol. 278, pp. 235-244.
Sheng, "TiC Supported Pt—Ir Electrocatalyst Prepared by Plasma Process for The Oxygen Electrode in Unitized Regenerative Fuel Cells," Journal of Power Sources, 2011, vol. 196, No. 13, pp. 5416-5422.
Shui, Evolution of Nanoporous Pt—Fe Alloy Nanowires by Dealloying and their Catalytic Property for Oxygen Reduction Reaction, Advanced Functional Materials, Sep. 2011, vol. 21, No. 17, pp. 3357-3362.
Sudachom, "One Step $NaBH_4$ Reduction of Pt—Ru—Ni Catalysts on Different Types of Carbon Supports for Direct Ethanol Fuel Cells: Synthesis and Characterization," Journal of Fuel Chemistry and Technology, May 2017, vol. 45, No. 5, pp. 596-607.
Sun, "Ternary PtRuNi Nanocatalysts Supported on N-Doped Carbon Nanotubes: Deposition Process, Material Characterization, and Electrochemistry," Journal of the Electrochemical Society, Aug. 2009, vol. 156, No. 10, pp. B1249-B1252.
Tang, "High dispersion and electrocatalytic properties of platinum on well-aligned carbon nanotube arrays", Carbon, 2004, vol. 42, pp. 191-197.
Vliet, "Mesostructured thin films as electrocatalysts with tunable composition and surface morphology", Nature Materials, Nov. 2012, vol. 11, No. 12, pp. 1051-1058.
Wang, "Structurally ordered intermetallic platinum-cobalt core-shell nanoparticles with enhanced activity and stability as oxygen reduction electrocatalysts", Nature Materials, Jan. 2013, vol. 12, No. 1, pp. 81-87.
Wang, "An Advantageous Method for Methanol Oxidation: Design and Fabrication of a Nanoporous PtRuNi Trimetallic Electrocatalyst," Journal of Power Sources, Nov. 2011, vol. 196, No. 22, pp. 9346-9351.
Wang, "Effect of a Carbon Support Containing Large Mesopores on the Performance of a Pt—Ru—Ni/C Catalyst for Direct Methanol Fuel Cells," Journal of Physical Chemistry C, 2010, vol. 114, No. 1, pp. 672-677.
Wang, "Effect of Annealing Heat Treatment on Stability of Pt—Ru—Ni/C Catalyst for Direct Methanol Fuel Cell," Chinese Journal of Power Sources, Feb. 2009, Abstract only.
Wang, "Effect of Ni on PtRu/C Catalyst Performance for Ethanol Electrooxidation in Acidic Medium," Journal of Physical Chemistry C, 2008, vol. 112, No. 16, pp. 6582-6587.
Wang, "Electrochemical Impedance Studies on Carbon Supported PtRuNi and PtRu Anode Catalysts in Acid Medium for Direct Methanol Fuel Cell," Journal of Power Sources, Feb. 2007, vol. 165, No. 1, pp. 9-15.
Woo, "Electrocatalytic Characteristics of Pt—Ru—Co and Pt—Ru—Ni Based on Covalently Cross-Linked Sulfonated Poly (ether ether ketone)/Heteropolyacids Composite Membranes for Water Electrolysis", Journal of Industrial and Engineering Chemistry, Sep. 2010, vol. 16, No. 5, pp. 688-697.
Yang, "Truncated Octahedral Platinum-Nickel-Iridium Ternary Electrocatalyst for Oxygen Reduction Reaction", Journal of Power Sources, 2015, vol. 291, pp. 201-208.
Ye, "Carbon Nanotubes Supported Pt—Ru—Ni as Methanol Electro-Oxidation Catalyst for Direct Methanol Fuel Cells," Journal of Natural Gas Chemistry, Jun. 2007, vol. 16, No. 2, pp. 162-166.
Yousaf, "Method to Prepare Ternary Methanol Electro-Oxidation Catalysts for Direct Methanol Fuel Cell Applications" Journal of The Electrochemical Society, Apr. 2017, vol. 164, No. 6, pp. 667-673.
Zhang, "Preparation of Pt—Ru—Ni Ternary Nanoparticles by Microemulsion and Electrocatalytic Activity for Methanol Oxidation," Materials Research Bulletin, Feb. 2007, vol. 42, No. 2, pp. 327-333.
Zhao, "Electrodeposition of Pt—Ru and Pt—Ru—Ni Nanoclusters on Multi-Walled Carbon Nanotubes for Direct Methanol Fuel Cell," International Journal of Hydrogen Energy, Mar. 2014, vol. 39, No. 9, pp. 4544-4557.
International Search Report for PCT International Application No. PCT/IB2019/052499, dated Jun. 6, 2019, 5 pages.

* cited by examiner

CATALYST COMPRISING PT, NI, AND CR

CROSS REFERENCE TO RELATED APPLICATIONS

This application is a national stage filing under 35 U.S.C. 371 of PCT/IB2019/052499, filed Mar. 27, 2019, which claims the benefit of U.S. Provisional Patent Application No. 62/652,624, filed Apr. 4, 2018, the disclosure of which is incorporated by reference herein in its entirety.

This invention was made with Government support under Contract No. DE-EE0007270 awarded by DOE. The Government has certain rights in this invention.

BACKGROUND

Fuel cells produce electricity via electrochemical oxidation of a fuel and reduction of an oxidant. Fuel cells are generally classified by the type of electrolyte and the type of fuel and oxidant reactants. One type of fuel cell is a polymer electrolyte membrane fuel cell (PEMFC), where the electrolyte is a polymeric ion conductor and the reactants are hydrogen fuel and oxygen as the oxidant. The oxygen is often provided from the ambient air.

PEMFCs typically require the use of electrocatalysts to improve the reaction rate of the hydrogen oxidation reaction (HOR) and oxygen reduction reactions (ORR), which improve the PEMFC performance. PEMFC electrocatalysts often comprise platinum, a relatively expensive precious metal. It is typically desirable to minimize the platinum content in PEMFC increasing the catalyst activity per unit catalyst surface area (specific activity) and increasing the catalyst surface area per catalyst mass (specific surface area or specific area). The HOR and ORR occur on the catalyst surface, so increasing the specific surface area and/or the specific activity can reduce the devices to minimize cost. Sufficient platinum content, however, is needed to provide sufficient catalytic activity and PEMFC device performance. As such, there is a desire to increase the catalyst activity per unit catalyst mass (mass activity). There are two general approaches to increase the mass activity, namely amount of catalyst needed to achieve a desired absolute performance, reducing cost.

To maximize specific area, PEMFC electrocatalysts are often in the form of nanometer-scale thin films or particles on support materials. An exemplary support material for nanoparticle PEMFC electrocatalysts is carbon black, and an exemplary support material for thin film electrocatalysts is whiskers.

To increase the specific activity, PEMFC Pt ORR electrocatalysts often also comprise certain transition metals such as cobalt or nickel. Without being bound by theory, incorporation of certain transition metals into the Pt lattice is believed to induce contraction of the Pt atoms at the catalyst surface, which increases the kinetic reaction rate by modification of the molecular oxygen binding and dissociation energies and the binding energies of reaction intermediates and/or spectator species.

PEMFC electrocatalysts may incorporate other precious metals. For example, HOR PEMFC Pt electrocatalysts can be alloyed with ruthenium to improve tolerance to carbon monoxide, a known Pt catalyst poison. HOR and ORR PEMFC electrocatalysts may also incorporate iridium to facilitate improved activity for the oxygen evolution reaction (OER). Improved OER activity may improve the durability of the PEMFC under inadvertent operation in the absence of fuel and during PEMFC system startup and shutdown. Incorporation of iridium into the PEMFC ORR electrocatalyst, however, may result in decreased mass activity and higher catalyst cost. Iridium has relatively lower specific activity for ORR than platinum, potentially resulting in decreased mass activity. Iridium is also a precious metal, and thereby its incorporation can increase cost. PEMFC Pt electrocatalysts may also incorporate gold which is also a precious metal and can increase cost. Gold is known to be relatively inactive for HOR and ORR in acidic electrolytes. Incorporation of gold can result in substantial deactivation for HOR and ORR due to the propensity for gold to preferentially segregate to the electrocatalyst surface, blocking active catalytic sites.

PEMFC electrocatalysts may have different structural and compositional morphologies. The structural and compositional morphologies are often tailored through specific processing methods during the electrocatalyst fabrication, such as variations in the electrocatalyst deposition method and annealing methods. PEMFC electrocatalysts can be compositionally homogenous, compositionally layered, or may contain composition gradients throughout the electrocatalyst. Tailoring of composition profiles within the electrocatalyst may improve the activity and durability of electrocatalysts. PEMFC electrocatalyst particles or nanometer-scale films may have substantially smooth surfaces or have atomic or nanometer scale roughness. PEMFC electrocatalysts may be structurally homogenous or may be nanoporous, being comprised of nanometer-scale pores and solid catalyst ligaments.

As compared to structurally homogenous electrocatalysts, nanoporous PEMFC electrocatalysts may have higher specific area, thereby reducing cost. Nanoporous catalysts are comprised of numerous interconnected nanoscale catalyst ligaments, and the surface area of a nanoporous material depends upon the diameter and volumetric number density of the nanoscale ligaments. Surface area is expected to increase as the nanoscale ligaments diameter decreases and the volumetric number density increases. In PEMFC devices, electrocatalysts may lose performance over time due to a variety of degradation mechanisms, which induce structural and compositional changes. Such performance loss may shorten the practical lifetime of such systems. Electrocatalyst degradation may occur, for example, due to loss of electrocatalyst activity per unit surface area and loss of electrocatalyst surface area. Electrocatalyst specific activity may be lost, for example, due to the dissolution of electrocatalyst alloying elements. Nanoparticle and nanoscale thin film electrocatalysts may lose surface area, for example, due to Pt dissolution, particle sintering, and loss of surface roughness. Nanoporous electrocatalysts may additionally lose surface area, for example, due to increased nanoscale ligament diameter and decreased nanoscale ligament density.

Additional electrocatalysts and systems containing such catalysts are desired, including those that address one or more of the issues discussed above.

SUMMARY

In one aspect, the present disclosure provides a catalyst comprising nanostructured elements comprising microstructured whiskers having an outer surface at least partially covered by a catalyst material comprising at least 90 (in some embodiments, at least 95, 96, 97, 98, 99, 99.5, 99.6, 99.7, 99.8, 99.9, or event 100) atomic percent collectively Pt, Ni, and Cr, wherein the Pt is present in a range from 32.4 to 35.8 atomic percent, the Ni is present in a range from 57.7 to 63.7 atomic percent, and the Cr is present in a range from 0.5 to 10.0 atomic percent (in some embodiments, the Pt is present in a range from 33.8 to 35.8 atomic percent, the Ni is present in a range from 60.3 to 63.7 atomic percent, and the Cr is present in a range from 0.5 to 5.9 atomic percent; the Pt is present in a range from 34.2 to 35.8 atomic percent, the Ni is present in a range from 60.8 to 63.7 atomic percent, and the Cr is present in a range from 0.5 to 5.0 atomic percent; the Pt is present in a range from 35.3 to 35.8 atomic percent, the Ni is present in a range from 62.8 to 63.7 atomic percent, and the Cr is present in a range from 0.5 to 2.0 atomic percent; the Pt is present in a range from 35.6 to 35.8 atomic percent, the Ni is present in a range from 63.4 to 63.7 atomic percent, and the Cr is present in a range from 0.5 to 1.0 atomic percent; the Pt is present in a range from 32.4 to 35.6 atomic percent, the Ni is present in a range from 57.7 to 63.4 atomic percent, and the Cr is present in a range from 1.0 to 10.0 atomic percent; the Pt is present in a range from 33.8 to 35.6 atomic percent, the Ni is present in a range from 60.3 to 63.4 atomic percent, and the Cr is present in a range from 1.0 to 5.9 atomic percent; the Pt is present in a range from 34.2 to 35.6 atomic percent, the Ni is present in a range from 60.8 to 63.4 atomic percent, and the Cr is present in a range from 1.0 to 5.0 atomic percent; the Pt is present in a range from 35.3 to 35.6 atomic percent, the Ni is present in a range from 62.8 to 63.4 atomic percent, and the Cr is present in a range from 1.0 to 2.0 atomic percent; the Pt is present in a range from 32.4 to 35.3 atomic percent, the Ni is present in a range from 57.7 to 62.8 atomic percent, and the Cr is present in a range from 2.0 to 10.0 atomic percent; the Pt is present in a range from 33.8 to 35.3 atomic percent, the Ni is present in a range from 60.3 to 62.8 atomic percent, and the Cr is present in a range from 2.0 to 5.9 atomic percent; and even the Pt is present in a range from 34.2 to 35.3 atomic percent, the Ni is present in a range from 60.8 to 62.8 atomic percent, and the Cr is present in a range from 2.0 to 5.0 atomic percent), and wherein the total atomic percent of Pt, Ni, and Cr equals 100.

In some embodiments, the catalyst material functions as an oxygen reduction catalyst material.

In some embodiments, catalysts described herein have been annealed.

Surprisingly, Applicants discovered the addition of chromium to PtNi catalyst can substantially improve retention of mass activity, specific area, and/or performance after accelerated electrocatalyst aging. Chromium was observed to improve the durability when incorporated at the surface of the catalyst prior to annealing.

Catalysts described herein are useful, for example, in fuel cell membrane electrode assemblies.

DETAILED DESCRIPTION

Figure 1:
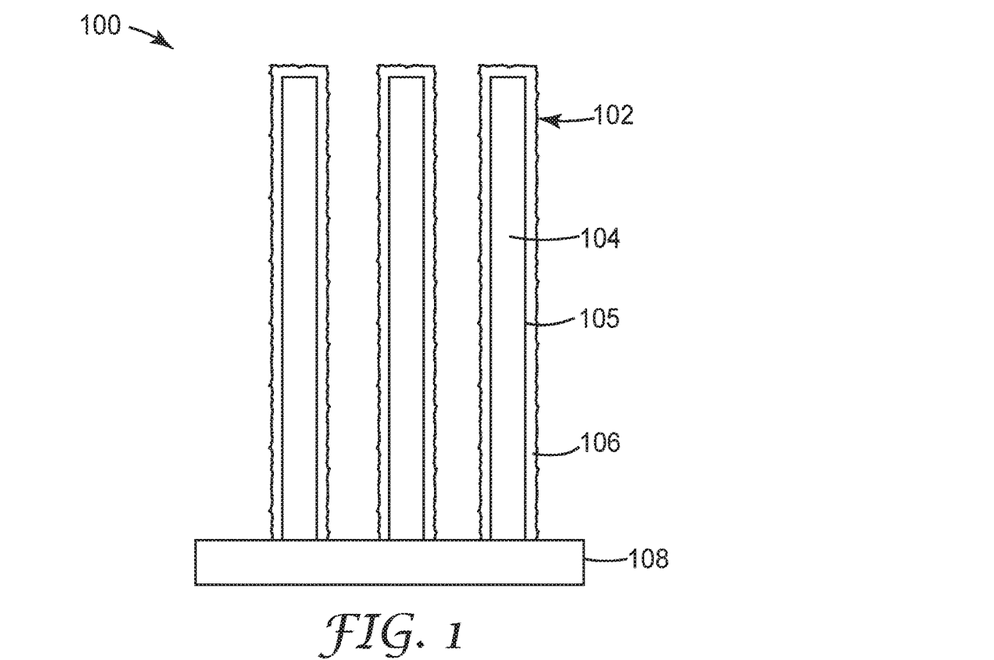
FIG. 1 is a side view of an exemplary catalyst described herein.

Referring to FIG. 1, exemplary catalyst described herein 100 on substrate 108 has nanostructured elements 102 with microstructured whiskers 104 having outer surface 105 at least partially covered by catalyst material 106 comprising at least 90 atomic percent collectively Pt, Ni, and Cr, wherein the Pt is present in a range from 32.4 to 35.8 atomic percent, the Ni is present in a range from 57.7 to 63.7 atomic percent, and the Cr is present in a range from 0.5 to 10.0 atomic percent, and wherein the total atomic percent of Pt, Ni, and Cr equals 100.

Suitable whiskers can be provided by techniques known in the art, including those described in U.S. Pat. No. 4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vernstrom et al.), the disclosures of which are incorporated herein by reference. In general, microstructured whiskers can be provided, for example, by vacuum depositing (e.g., by sublimation) a layer of organic or inorganic material onto a substrate (e.g., a microstructured catalyst transfer polymer sheet), and then, in the case of perylene red deposition, converting the perylene red pigment into microstructured whiskers by thermal annealing. Typically, the vacuum deposition steps are carried out at total pressures at or below about 10$^{-3}$ Torr or 0.1 Pascal. Exemplary microstructures are made by thermal sublimation and vacuum annealing of the organic pigment C.I. Pigment Red 149 (i.e., N,N'-di(3,5-xylyl)perylene-3,4:9,10-bis(dicarboximide)). Methods for making organic microstructured layers are reported, for example, in Materials Science and Engineering, A158 (1992), pp. 1-6; J. Vac. Sci. Technol. A, 5, (4), July/August 1987, pp. 1914-16; J. Vac. Sci. Technol. A, 6, (3), May/August 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August 1980, pp. 211-16; and U.S. Pat. No. 4,340,276 (Maffitt et al.) and U.S. Pat. No. 4,568,598 (Bilkadi et al.), the disclosures of which are incorporated herein by reference. Properties of catalyst layers using carbon nanotube arrays are reported in the article "High Dispersion and Electrocatalytic Properties of Platinum on Well-Aligned Carbon Nanotube Arrays", Carbon, 42, (2004), pp. 191-197. Properties of catalyst layers using grassy or bristled silicon are reported, for example, in U.S. Pat. App. Pub. No. 2004/0048466 A1 (Gore et al.).

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. App. Pub. No. 2002/0004453 A1 (Haugen et al.), the disclosures of which are incorporated herein by reference). One exemplary apparatus is depicted schematically in FIG. 4A of U.S. Pat. No. 5,338,430 (Parsonage et al.), and discussed in the accompanying text, wherein the substrate is mounted on a drum, which is then rotated over a sublimation or evaporation source for depositing the organic precursor (e.g., perylene red pigment) prior to annealing the organic precursor in order to form the whiskers.

Typically, the nominal thickness of deposited perylene red pigment is in a range from about 50 nm to 500 nm. Typically, the whiskers have an average cross-sectional dimension in a range from 20 nm to 60 nm, an average length in a range from 0.3 micrometer to 3 micrometers, and an areal number density in a range from 30 to 70 whiskers per square micrometer.

In some embodiments, the whiskers are attached to a backing. Exemplary backings comprise polyimide, nylon, metal foils, or other materials that can withstand the thermal annealing temperature up to 300° C. In some embodiments, the backing has an average thickness in a range from 25 micrometers to 125 micrometers.

In some embodiments, the backing has a microstructure on at least one of its surfaces. In some embodiments, the microstructure is comprised of substantially uniformly shaped and sized features at least three (in some embodiments, at least four, five, ten, or more times the average size of the whiskers. The shapes of the microstructures can, for example, be V-shaped grooves and peaks (see, e.g., U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference). In some embodiments, some fraction of the microstructure features extends above the average or majority of the microstructured peaks in a periodic fashion, such as every $31^{st}$ V-groove peak being 25% or 50% or even 100% taller than those on either side of it. In some embodiments, this fraction of features that extends above the majority of the microstructured peaks can be up to 10% (in some embodiments up to 3%, 2%, or even up to 1%). Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures, so much less of the microstructured material or whisker material is likely to be scraped or otherwise disturbed as the substrate moves through the coating process. In some embodiments, the microstructure features are substantially smaller than half the thickness of the membrane that the catalyst will be transferred to in making a membrane electrode assembly. This is so that during the catalyst transfer process, the taller microstructure features do not penetrate through the membrane where they may overlap the electrode on the opposite side of the membrane. In some embodiments, the tallest microstructure features are less than $\frac{1}{3}^{rd}$ or $\frac{1}{4}^{th}$ of the membrane thickness. For the thinnest ion exchange membranes (e.g., about 10 micrometers to 15 micrometers in thickness), it may be desirable to have a substrate with microstructured features no larger than about 3 micrometers to 4.5 micrometers tall. The steepness of the sides of the V-shaped or other microstructured features or the included angles between adjacent features may, in some embodiments, be desirable to be on the order of 90° for ease in catalyst transfer during a lamination-transfer process and to have a gain in surface area of the electrode that comes from the square root of two (1.414) surface area of the microstructured layer relative to the planar geometric surface of the substrate backing.

In general, the catalyst can be deposited by techniques known in the art. Exemplary deposition techniques include those independently selected from the group consisting of sputtering (including reactive sputtering), atomic layer deposition, molecular organic chemical vapor deposition, molecular beam epitaxy, thermal physical vapor deposition, vacuum deposition by electrospray ionization, and pulse laser deposition. Additional general details can be found, for example, in U.S. Pat. No. 5,879,827 (Debe et al.), U.S. Pat. No. 6,040,077 (Debe et al.), and U.S. Pat. No. 7,419,741 (Vernstrom et al.), the disclosures of which are incorporated herein by reference. The thermal physical vapor deposition method uses suitable elevated temperature (e.g., via resistive heating, electron beam gun, or laser) to melt or sublimate the target (source material) into a vapor state, which is in turn passed through a vacuum space, then condensing of the vaporized form onto substrate surfaces. Thermal physical vapor deposition equipment is known in the art, including that available, for example, as a metal evaporator or as an organic molecular evaporator from CreaPhys GmbH, Dresden, Germany, under the trade designations "METAL EVAPORATOR (ME-SERIES)" or "ORGANIC MOLECULAR EVAPORATOR (DE-SERIES)" respectively; another example of an organic materials evaporator is available from Mantis Deposition LTD, Oxfordshire, UK, under the trade designation "ORGANIC MATERIALS EVAPORATIOR (ORMA-SERIES)." Catalyst material comprising multiple alternating layers can be sputtered, for example, from multiple targets (e.g., Pt is sputtered from a first target, Ni is sputtered from a second target, and Cr from a third, or from a target(s) comprising more than one element (e.g., Pt and Ni)). If the catalyst coating is done with a single target, it may be desirable that the coating layer be applied in a single step onto the gas distribution layer, gas dispersion layer, catalyst transfer layer, or membrane, so that the heat of condensation of the catalyst coating heats the underlying catalyst or support Pt, Ni, or Cr atoms as applicable and substrate surface sufficient to provide enough surface mobility that the atoms are well mixed and form thermodynamically stable alloy domains. Alternatively, for example, the substrate can also be provided hot or heated to facilitate this atomic mobility. In some embodiments, sputtering is conducted at least in part in an atmosphere comprising argon. Organometallic forms of catalysts can be deposited, for example, by soft or reactive landing of mass selected ions. Soft landing of mass-selected ions is used to transfer catalytically-active metal complexes complete with organic ligands from the gas phase onto an inert surface. This method can be used to prepare materials with defined active sites and thus achieve molecular design of surfaces in a highly controlled way under either ambient or traditional vacuum conditions. For additional details see, for example, Johnson et al., Anal. Chem., 2010, 82, pp. 5718-5727, and Johnson et al., Chemistry: A European Journal, 2010, 16, pp. 14433-14438, the disclosures of which are incorporated herein by reference.

The planar equivalent thickness of an individual deposited catalyst layer is the thickness if deposited on a substantially flat, planar substrate. The planar equivalent thickness may depend, for example, on the areal catalyst loading of the layer and the catalyst density. For example, the planar equivalent thickness of a single layer of Pt with 10 micrograms of Pt per $cm^2$ planar area and density of 21.45 $g/cm^3$ deposited is calculated as 4.7 nm, and the thickness of a Ni layer (8.90 $g/cm^3$) with the same areal loading is 11.2 nm. The thickness of a deposited layer can range from a sub-monolayer to several monolayers in thickness. A monolayer is a single, closely packed layer of atoms or molecules. The thickness of a monolayer is of the dimension of the atomic or molecular diameter. The diameter of a Pt atom is about 0.27 nm. The diameter of a Ni atom is about 0.27 nm. The diameter of a Cr atom is about 0.28 nm. A sub-monolayer is the same physical thickness of a monolayer, but contains fewer atoms or molecules than a closely packed layer. For example, a Pt sub-monolayer which had 50% of the number of Pt atoms per unit area as a full monolayer has a calculated thickness which is 50% of a full monolayer (i.e., about 0.135 nm). One or more layers can be deposited, resulting in a catalyst material with an overall planar equivalent thickness equal to the sum of each constituent layer's planar equivalent thickness.

In some embodiments, the catalyst material has a thickness that is the planar equivalent thickness of the catalyst material divided by the combined surface area of the whiskers and the backing. For example, a catalyst material with a planar equivalent thickness of 20 nm deposited onto a surface comprising microstructured whiskers on a planar backing with a combined surface area of 10 cm$^2$ of surface area per cm$^2$ of planar backing area will result in a catalyst thickness of 2 nm on the whisker. The surface area of the whiskers depends upon the whisker cross-sectional dimension, whisker length, and whisker areal number density (number of whiskers per unit area of backing). In some embodiments, the surface area of the whiskers is in a range from 1 to 100 cm$^2$ per cm$^2$ of backing surface area (in some embodiments, in a range from 2 to 50 cm$^2$ per cm$^2$, 5 to 25 cm$^2$ per cm$^2$, or even 5 to 15 cm$^2$ per cm$^2$). In some embodiments, the backing may have a surface area in a range of 1 to 10 cm$^2$ per cm$^2$ planar backing area (in some embodiments, in a range from 1 to 5 cm$^2$ per cm$^2$, or even in a range from 1 to 2 cm$^2$ per cm$^2$). The combined surface area of the whiskers and the backing is the product of the whisker surface area and the backing surface area. For example, whiskers which have a surface area of 10 cm$^2$ per cm$^2$ backing area on a backing which has a surface area of 1.5 cm$^2$ of surface area per cm$^2$ planar backing area, will yield a combined surface area of 15 cm$^2$ of combined surface area per cm$^2$ planar backing area.

In some embodiments, methods for making catalyst material herein comprise annealing the catalyst. In general, annealing can be done by techniques known in the art, including heating the catalyst material via, for example, in an oven or furnace, with a laser, and with infrared techniques. Annealing can be conducted, for example, in inert or reactive gas environments. Although not wanting to be bound by theory, it is believed annealing can induce structural changes on the atomic scale which can influence activity and durability of catalysts. Further, it is believed annealing nanoscale particles and films can induce mobility in the atomic constituent(s), which can cause growth of particles or thin film grains. In the case of multi-element mixtures, alloys, or layered particles and films, it is believed annealing can induce, for example, segregation of components within the particle or film to the surface, formation of random, disordered alloys, and formation of ordered intermetallics, depending upon the component element properties and the annealing environment. For additional details regarding annealing see, for example, van der Vliet et al., Nature Materials, 2012, 11, pp. 1051-1058; Wang et al., Nature Materials, 2013, 12, pp. 81-87, and U.S. Pat. No. 8,748,330 B2 (Debe et al.), the disclosures of which are incorporated herein by reference.

In some embodiments, the catalyst material comprises a layer comprising platinum and nickel and a layer comprising chromium on the layer comprising platinum and nickel. In some embodiments, the layer(s) comprising platinum and nickel collectively has a planar equivalent thickness up to 600 nm (in some embodiments, up to 575 nm, 550 nm, 500 nm, 400 nm, 300 nm, 200 nm, 100 nm, 75 nm, 50 nm, 25 nm, 10 nm, 5 nm, 2.5 nm, 1 nm, or even up to two monolayers (e.g., 0.4 nm); in some embodiments, in a range from 0.4 nm to 600 nm, 0.4 nm to 500 nm, 1 nm to 500 nm, 5 nm to 500 nm, 10 nm to 500 nm, 10 nm to 400 nm, or even 40 nm to 300 nm) and the layer comprising chromium has a planar equivalent thickness up to 100 nm (in some embodiments, up to 75 nm, 50 nm, 45 nm, 40 nm, 35 nm, 30 nm, 25 nm, 20 nm, 15 nm, 10 nm, 5 nm, 4 nm, 3 nm, 2 nm, 1 nm, a monolayer (e.g., 0.2 nm) or even less than a monolayer (e.g., 0.01 nm); in some embodiments, in a range from 0.01 nm to 100 nm, 1 nm to 50 nm, 5 nm to 40 nm, or even 5 nm to 35 nm). In some embodiments, each layer independently has a planar equivalent thickness up to 100 nm (in some embodiments, up to 50 nm, 20 nm, 15 nm, 10 nm, 5 nm, 4 nm, 3 nm, 2 nm, 1 nm, a monolayer (e.g., 0.2 nm), or even up to less than a monolayer (e.g. 0.01 nm); in some embodiments, in a range from 0.01 nm to 100 nm, 0.01 nm to 50 nm, 0.1 nm to 15 nm, 0.1 nm to 10 nm, or even 1 nm to 5 nm).

In some embodiments, the catalyst material comprises alternating layers comprising platinum and nickel and layers comprising chromium (i.e., a layer comprising platinum and nickel, a layer comprising chromium, a layer comprising platinum and nickel, a layer comprising chromium, etc.). In some embodiments, at least 2, 3, 4, 5, 10, 15, 20, 25, 50, 75, 100, 150, 200, 250, or even at least 275 sets of the alternating layers. In some embodiments, each layer independently has a planar equivalent thickness up to 100 nm (in some embodiments, up to 50 nm, 20 nm, 15 nm, 10 nm, 5 nm, 4 nm, 3 nm, 2 nm, 1 nm, a monolayer (e.g., 0.2 nm), or even up to less than a monolayer (e.g. 0.01 nm); in some embodiments, in a range from 0.01 nm to 100 nm, 0.01 nm to 50 nm, 0.1 nm to 15 nm, 0.1 nm to 10 nm, or even 1 nm to 5 nm).

In some embodiments, the catalyst material comprises a layer comprising platinum, a layer comprising nickel on the layer comprising platinum, and a layer comprising chromium on the layer comprising nickel. In some embodiments, the catalyst material comprises a layer comprising nickel, a layer comprising platinum on the layer comprising nickel, and a layer comprising chromium on the layer comprising platinum. In some embodiments, the catalyst has an exposed chromium surface layer (in some embodiments, the exposed chromium surface layer is a sub-monolayer of chromium).

In some embodiments, the catalyst material comprises repeating sequential individual layers of platinum, nickel, and chromium. In some embodiments, at least 2, 3, 4, 5, 10, 15, 20, 25, 50, 75, 100, 150, 200, 250, or even at least 275 sets of the repeating layers.

In some embodiments, the weight ratio of platinum to chromium is in a range from 6:1 to 140:1 (in some embodiments, in a range from 11:1 to 140:1, in a range from 13:1 to 140:1, in a range from 13:1 to 140:1, in a range from 34:1 to 140:1, in a range from 69:1 to 140:1, in a range from 6:1 to 70:1, in a range from 11:1 to 70:1, in a range from 13:1 to 70:1, in a range from 34:1 to 70:1, in a range from 6:1 to 69:1, in a range from 11:1 to 69:1, in a range from 13:1 to 69:1, in a range from 34:1 to 69:1, in a range from 6:1 to 34:1, in a range from 11:1 to 34:1, and even in a range from 13:1 to 34:1). In some embodiments, the atomic ratio of platinum to nickel is in a range from 32.5:67.5 to 90.0:10.0 (in some embodiments, in a range from 32.5:67.5 to 80.0: 20.0; 32.5:67.5 to 70.0:30.0; 32.5:67.5 to 60.0:40.0; 32.5: 67.5 to 50.0:50.0; 32.5:67.5 to 42.5:57.5; 32.5:67.5 to 40.0: 60.0; 32.5:67.5 to 37.5:62.5; 32.5:67.5 to 35.0:65.0; and even 35.0:65.0 to 40.0:60.0).

In some embodiments, the catalyst is essentially nonporous (i.e., the catalyst contains spherical and/or aspherical void volume, wherein the void volume is at least 75% contained within the catalyst thin film (in some embodiments, 85, 90, 95, 99, or even 100% contained within the catalyst thin film), and wherein the average diameter of the void volume is less than 1 nm (in some embodiments, less than 0.8 nm, 0.6 nm, 0.4 nm, 0.2 nm, or even 0.01 nm)).

In some embodiments, the thickness of the catalyst material on the whiskers can be up to 100 nm (in some embodiments, up to 50 nm, 20 nm, 15 nm, 10 nm, 5 nm, 4 nm, 3 nm, 2 nm, 1 nm, a monolayer (e.g., 0.2 nm), or even up to less than a monolayer (e.g. 0.01 nm); in some embodiments, in a range from 0.01 nm to 100 nm, 0.01 nm to 50 nm, 0.1 nm to 15 nm, 0.1 nm to 10 nm, 0.1 nm to 5 nm, or even 1 nm to 5 nm).

In some embodiments, methods for making catalyst described herein comprise annealing the catalyst.

In some embodiments, methods for making catalyst described herein comprise depositing platinum and nickel from a target comprising platinum and nickel and depositing chromium from a target comprising chromium. In some embodiments, methods for making catalyst described herein comprise depositing platinum and nickel from a $Pt_{38}Ni_{62}$ target. In some embodiments, methods for making catalyst described herein comprise depositing layer(s) comprising platinum and nickel which each independently have a planar equivalent thickness in a range from 0.2 nm to 100 nm (in some embodiments, in a range from 0.2 nm to 20 nm, or even 0.2 nm to 10 nm) and the layer(s) comprising chromium each independently have a planar equivalent thickness in a range from 0.01 nm to 20 nm (in some embodiments, in a range from 0.01 nm to 10 nm, 0.01 nm to 5 nm, 0.02 nm to 5 nm, 0.02 nm to 1 nm, or even 0.1 nm to 1 nm).

In some embodiments, methods for making catalyst described herein comprise depositing platinum from a target comprising platinum, depositing nickel from a target comprising nickel, and depositing chromium from a target comprising chromium. In some embodiments, methods for making catalyst described herein comprise depositing a layer comprising platinum, an adjacent layer comprising nickel, and an adjacent layer comprising chromium collectively having a planar equivalent thickness in a range from 0.4 nm to 100 nm (in some embodiments, in a range from 1 nm to 100 nm, in a range from 1 nm to 50 nm, in a range from 1 nm to 30 nm, in a range from 2 nm to 50 nm, in a range from 2 nm to 30 nm, in a range from 5 nm to 50 nm, and even in a range from 10 nm to 30 nm). In some embodiments, methods for making catalyst described herein comprise depositing layer(s) comprising platinum each independently have a planar equivalent thickness in a range from 0.2 nm to 50 nm (in some embodiments, in a range from 0.2 nm to 20 nm, or even 0.2 nm to 10 nm), layers comprising nickel each independently have a planar equivalent thickness in a range from 0.2 nm to 100 nm (in some embodiments, in a range from 0.2 nm to 25 nm, or even 0.2 nm to 10 nm) and layer(s) comprising chromium each independently have a planar equivalent thickness in a range from 0.01 nm to 20 nm (in some embodiments, in a range from 0.01 nm to 10 nm, 0.01 nm to 5 nm, 0.02 nm to 5 nm, 0.02 nm to 1 nm, or even 0.1 nm to 1 nm).

In some embodiments, catalysts described herein may further comprise at least one of Ru or Ta. The Ru and/or Ta can be incorporated into the catalyst, for example, by modifying the methods described here in to use a target comprising Ru and/or Ta, as applicable.

Catalysts described herein are useful, for example, in fuel cell membrane electrode assemblies (MEAs). "Membrane electrode assembly" refers to a layered sandwich of fuel cell materials comprising a membrane, anode and cathode electrode layers, and gas diffusion layers. Typically, the cathode catalyst layer comprises a catalyst described herein, although in some embodiments, the anode catalyst layer independently comprises a catalyst described herein.

An MEA comprises, in order:
a first gas distribution layer having first and second opposed major surfaces;
an anode catalyst layer having first and second opposed major surfaces, the anode catalyst comprising a first catalyst;
an electrolyte membrane;
a cathode catalyst layer having first and second opposed major surfaces, the cathode catalyst comprising a second catalyst; and
a second gas distribution layer having first and second opposed major surfaces.

Electrolyte membranes conduct reaction intermediate ions between the anode and cathode catalyst layers. Electrolyte membranes preferably have high durability in the electrochemical environment, including chemical and electrochemical oxidative stability. Electrolyte membranes preferably have low ionic resistance for the transport of the reaction intermediate ions, but are relatively impermeable barriers for other ions, electrons, and reactant species. In some embodiments, the electrolyte membrane is a proton exchange membrane (PEM), which conducts cations. In PEM fuel cells, the electrolyte membrane preferably conducts protons. PEMs are typically a partially fluorinated or perfluorinated polymer comprised of a structural backbone and pendant cation exchange groups, PEMs are available, for example, from E. I. du Pont de Nemours and Company, Wilmington, Del., under the trade designation "NAFION;" Solvay, Brussels, Belgium, under the trade designation "AQUIVION;" 3M Company, St. Paul, Minn., under the designation "3M PFSA MEMBRANE;" and Asahi Glass Co., Tokyo, Japan, under the trade designation "FLEMION."

A gas distribution layer generally delivers gas evenly to the electrodes and, in some embodiments, conducts electricity. It also provides for removal of water in either vapor or liquid form, in the case of a fuel cell. Gas distribution layers are typically porous to allow reactant and product transport between the electrodes and the flow field. Sources of gas distribution layers include carbon fibers randomly oriented to form porous layers, in the form of non-woven paper or woven fabrics. The non-woven carbon papers are available, for example, from Mitsubishi Rayon Co., Ltd., Tokyo, Japan, under the trade designation "GRAFIL U-105;" Toray Corp., Tokyo, Japan, under the trade designation "TORAY;" AvCarb Material Solutions, Lowell, Mass., under the trade designation "AVCARB;" SGL Group, the Carbon Company, Wiesbaden, Germany, under the trade designation "SIGRACET;" Freudenberg FCCT SE & Co. KG, Fuel Cell Component Technologies, Weinheim, Germany, under the trade designation "FREUDENBERG," and Engineered Fibers Technology (EFT), Shelton, Conn., under the trade designation "SPECTRACARB GDL." The woven carbon fabrics or cloths are available, for example, from ElectroChem Inc., Woburn, Mass., under the trade designations "EC-CC1-060" and "EC-AC-CLOTH;" NuVant Systems Inc., Crown Point, Ind., under the trade designations "ELAT-LT" and "ELAT;" BASF Fuel Cell GmbH, North America, under the trade designation "E-TEK ELAT LT;"

and Zoltek Corp., St. Louis, Mo., under the trade designation "ZOLTEK CARBON CLOTH." The non-woven paper or woven fabrics can be treated to modify its hydrophobicity (e.g., treatment with a polytetrafluoroethylene (PTFE) suspension with subsequent drying and annealing). Gas dispersion layers often comprise a porous layer of sub-micrometer electronically-conductive particles (e.g., carbon), and a binder (e.g., PTFE). Although not wanting to be bound by theory, it is believed that gas dispersion layers facilitate reactant and product water transport between the electrode and the gas distribution layers.

At least one of the anode or cathode catalyst is catalyst described herein (i.e., catalyst comprising nanostructured elements comprising microstructured whiskers having an outer surface at least partially covered by a catalyst material comprising at least 90 (in some embodiments, at least 95, 96, 97, 98, 99, 99.5, 99.6, 99.7, 99.8, 99.9, or event 100) atomic percent collectively Pt, Ni, and Cr, wherein the Pt is present in a range from 32.4 to 35.8 atomic percent, the Ni is present in a range from 57.7 to 63.7 atomic percent, and the Cr is present in a range from 0.5 to 10.0 atomic percent (in some embodiments, the Pt is present in a range from 33.8 to 35.8 atomic percent, the Ni is present in a range from 60.3 to 63.7 atomic percent, and the Cr is present in a range from 0.5 to 5.9 atomic percent; the Pt is present in a range from 34.2 to 35.8 atomic percent, the Ni is present in a range from 60.8 to 63.7 atomic percent, and the Cr is present in a range from 0.5 to 5.0 atomic percent; the Pt is present in a range from 35.3 to 35.8 atomic percent, the Ni is present in a range from 62.8 to 63.7 atomic percent, and the Cr is present in a range from 0.5 to 2.0 atomic percent; the Pt is present in a range from 35.6 to 35.8 atomic percent the Ni is present in a range from 63.4 to 63.7 atomic percent, and the Cr is present in a range from 0.5 to 1.0 atomic percent; the Pt is present in a range from 32.4 to 35.6 atomic percent, the Ni is present in a range from 57.7 to 63.4 atomic percent, and the Cr is present in a range from 1.0 to 10.0 atomic percent; the Pt is present in a range from 33.8 to 35.6 atomic percent, the Ni is present in a range from 60.3 to 63.4 atomic percent, and the Cr is present in a range from 1.0 to 5.9 atomic percent; the Pt is present in a range from 34.2 to 35.6 atomic percent, the Ni is present in a range from 60.8 to 63.4 atomic percent, and the Cr is present in a range from 1.0 to 5.0 atomic percent; the Pt is present in a range from 35.3 to 35.6 atomic percent, the Ni is present in a range from 62.8 to 63.4 atomic percent, and the Cr is present in a range from 1.0 to 2.0 atomic percent; the Pt is present in a range from 32.4 to 35.3 atomic percent, the Ni is present in a range from 57.7 to 62.8 atomic percent, and the Cr is present in a range from 2.0 to 10.0 atomic percent; the Pt is present in a range from 33.8 to 35.3 atomic percent, the Ni is present in a range from 60.3 to 62.8 atomic percent, and the Cr is present in a range from 2.0 to 5.9 atomic percent; and even the Pt is present in a range from 34.2 to 35.3 atomic percent, the Ni is present in a range from 60.8 to 62.8 atomic percent, and the Cr is present in a range from 2.0 to 5.0 atomic percent), and wherein the total atomic percent of Pt, Ni, and Cr equals 100. The "other catalyst layer" can be a conventional catalyst known in the art, and provided by techniques known in the art (e.g., U.S. Pat. No. 5,759,944 (Buchanan et al.), U.S. Pat. No. 5,068,161 (Keck et al.), and U.S. Pat. No. 4,447,506 (Luczak et al.)), the disclosures of which are incorporated herein by reference.

A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

Figure 2:
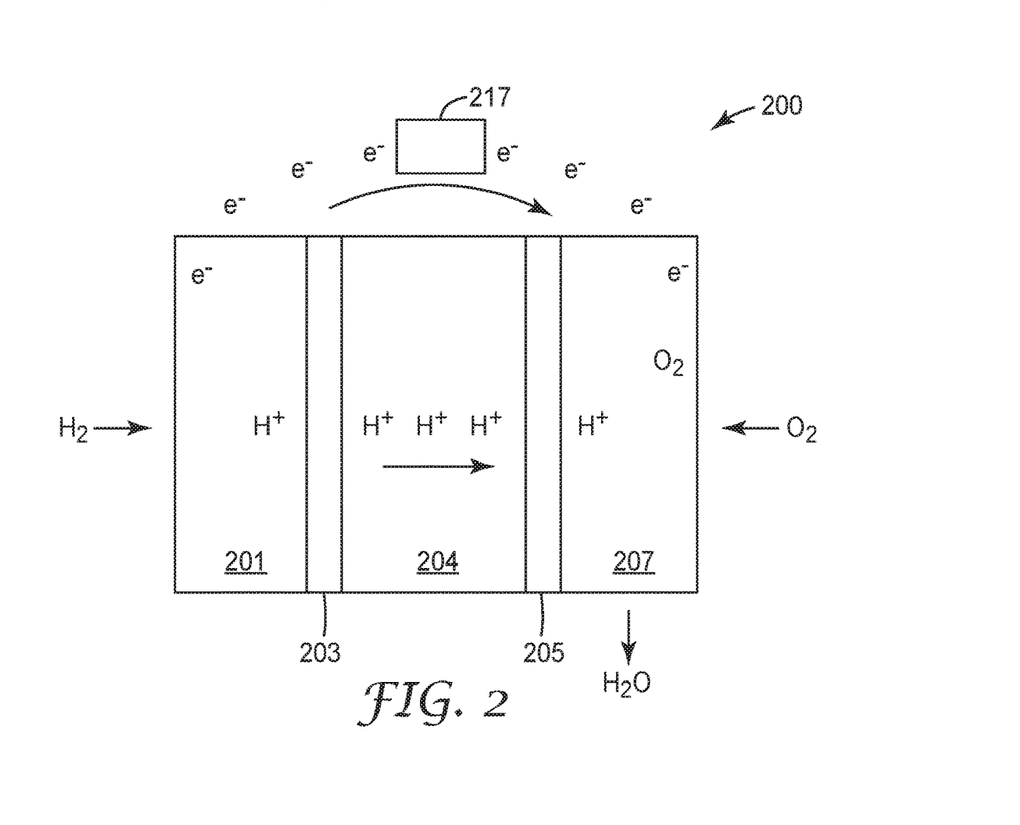
FIG. 2 is a schematic of an exemplary fuel cell.

Referring to FIG. 2, exemplary fuel cell 200 includes first gas distribution layer 201 adjacent to anode 203. Adjacent anode 203 is an electrolyte membrane 204. Cathode 205 is situated adjacent the electrolyte membrane 204, and second gas distribution layer 207 is situated adjacent cathode 205. In operation, hydrogen fuel is introduced into the anode portion of the fuel cell 200, passing through the first gas distribution layer 201 and over anode 203. At anode 203, the hydrogen fuel is separated into hydrogen ions (H) and electrons (e).

Electrolyte membrane 204 permits only the hydrogen ions or protons to pass through electrolyte membrane 204 to the cathode portion of fuel cell 200. The electrons cannot pass through the electrolyte membrane 204 and, instead, flow through an external electrical circuit in the form of electric current. This current can power an electric load 217, such as an electric motor, or be directed to an energy storage device, such as a rechargeable battery.

Oxygen flows into the cathode side of fuel cell 200 via second distribution layer 207. As the oxygen passes over cathode 205, oxygen, protons, and electrons combine to produce water and heat.

Exemplary Embodiments

1A. A catalyst comprising nanostructured elements comprising microstructured whiskers having an outer surface at least partially covered by a catalyst material comprising at least 90 (in some embodiments, at least 95, 96, 97, 98, 99, 995, 99.6, 99.7, 99.8, 99.9, or event 100) atomic percent collectively Pt, Ni, and Cr, wherein the Pt is present in a range from 32.4 to 35.8 atomic percent, the Ni is present in a range from 57.7 to 63.7 atomic percent, and the Cr is present in a range from 0.5 to 10.0 atomic percent (in some embodiments, the Pt is present in a range from 33.8 to 35.8 atomic percent, the Ni is present in a range from 60.3 to 63.7 atomic percent, and the Cr is present in a range from 0.5 to 5.9 atomic percent; the Pt is present in a range from 34.2 to 35.8 atomic percent, the Ni is present in a range from 60.8 to 63.7 atomic percent, and the Cr is present in a range from 0.5 to 5.0 atomic percent; the Pt is present in a range from 35.3 to 35.8 atomic percent, the Ni is present in a range from 62.8 to 63.7 atomic percent, and the Cr is present in a range from 0.5 to 2.0 atomic percent; the Pt is present in a range from 35.6 to 35.8 atomic percent, the Ni is present in a range from 63.4 to 63.7 atomic percent, and the Cr is present in a range from 0.5 to 1.0 atomic percent; the Pt is present in a range from 32.4 to 35.6 atomic percent, the Ni is present in a range from 57.7 to 63.4 atomic percent, and the Cr is present in a range from 1.0 to 10.0 atomic percent; the Pt is present in a range from 33.8 to 35.6 atomic percent, the Ni is present in a range from 60.3 to 63.4 atomic percent, and the Cr is present in a range from 1.0 to 5.9 atomic percent; the Pt is present in a range from 34.2 to 35.6 atomic percent, the Ni is present in a range from 60.8 to 63.4 atomic percent, and the Cr is present in a range from 1.0 to 5.0 atomic percent; the Pt is present in a range from 35.3 to 35.6 atomic percent, the Ni is present in a range from 62.8 to 63.4 atomic percent, and the Cr is present in a range from 1.0 to 2.0 atomic percent; the Pt is present in a range from 32.4 to 35.3 atomic percent, the Ni is present in a range from 57.7 to 62.8 atomic percent, and the Cr is present in a range from 2.0 to 10.0 atomic percent; the Pt is present in a range from 33.8 to 35.3 atomic percent, the Ni is present in a range from 60.3 to 62.8 atomic percent, and the Cr is present in a range from 2.0 to 5.9 atomic percent; and even the Pt is present in a range from 34.2 to 35.3 atomic percent, the Ni is present in a range from 60.8 to 62.8 atomic percent, and the Cr is present in a range from 2.0 to 5.0 atomic percent), and wherein the total atomic percent of Pt, Ni, and Cr equals 100.

2A. The catalyst of Exemplary Embodiment 1A, wherein the catalyst material comprises a layer comprising platinum and nickel and a layer comprising chromium on the layer comprising platinum and nickel.

3A. The catalyst of Exemplary Embodiment 2A, wherein the layer(s) comprising platinum and nickel collectively has a planar equivalent thickness up to 600 nm (in some embodiments, up to 575 nm, 550 nm, 500 nm, 400 nm, 300 nm, 200 nm, 100 nm, 75 nm, 50 nm, 25 nm, 10 nm, 5 nm, 2.5 nm, 1 nm, or even up to two monolayers (e.g., 0.4 nm); in some embodiments, in a range from 0.4 nm to 600 nm, 0.4 nm to 500 nm, 1 nm to 500 nm, 5 nm to 500 nm, 10 nm to 500 nm, 10 nm to 400 nm, or even 40 nm to 300 nm) and the layer comprising chromium has a planar equivalent thickness up to 100 nm (in some embodiments, up to 75 nm, 50 nm, 45 nm, 40 nm, 35 nm, 30 nm, 25 nm, 20 nm, 15 nm, 10 nm, 5 nm, 4 nm, 3 nm, 2 nm, 1 nm, a monolayer (e.g., 0.2 nm) or even less than a monolayer (e.g., 0.01 nm); in some embodiments, in a range from 0.01 nm to 100 nm, 1 nm to 50 nm, 5 nm to 40 nm, or even 5 nm to 35 nm).

4A. The catalyst of Exemplary Embodiment 3A, wherein each layer independently has a planar equivalent thickness up to 100 nm (in some embodiments, up to 50 nm, 20 nm, 15 nm, 10 nm, 5 nm, 4 nm, 3 nm, 2 nm, 1 nm, a monolayer (e.g., 0.2 nm), or even up to less than a monolayer (e.g. 0.01 nm); in some embodiments, in a range from 0.01 nm to 100 nm, 0.01 nm to 50 nm, 0.1 nm to 15 nm, 0.1 nm to 10 nm, or even 1 nm to 5 nm).

5A. The catalyst of Exemplary Embodiment 1A, wherein the catalyst material comprises alternating layers comprising platinum and nickel and layers comprising chromium (i.e., a layer comprising platinum and nickel, a layer comprising chromium, a layer comprising platinum and nickel, a layer comprising chromium, etc.). In some embodiments, at least 2, 3, 4, 5, 10, 15, 20, 25, 50, 75, 100, 150, 200, 250, or even at least 275 sets of the alternating layers.

6A. The catalyst of Exemplary Embodiment 5A, wherein each layer independently has a planar equivalent thickness up to 100 nm (in some embodiments, up to 50 nm, 20 nm, 15 nm, 10 nm, 5 nm, 4 nm, 3 nm, 2 nm, 1 nm, a monolayer (e.g., 0.2 nm), or even up to less than a monolayer (e.g. 0.01 nm); in some embodiments, in a range from 0.01 nm to 100 nm, 0.01 nm to 50 nm, 0.1 nm to 15 nm, 0.1 nm to 10 nm, or even 1 nm to 5 nm).

7A. The catalyst of Exemplary Embodiment 1A, wherein the catalyst material comprises a layer comprising platinum, a layer comprising nickel on the layer comprising platinum, and a layer comprising chromium on the layer comprising nickel.

8A. The catalyst of Exemplary Embodiment 1A, wherein the catalyst material comprises a layer comprising nickel, a layer comprising platinum on the layer comprising nickel, and a layer comprising chromium on the layer comprising platinum.

9A. The catalyst of any preceding A Exemplary Embodiment having an exposed chromium surface layer (in some embodiments, the exposed chromium surface layer is a sub-monolayer of chromium).

10A. The catalyst of Exemplary Embodiment 1A, wherein the catalyst material comprises repeating sequential individual layers of platinum, nickel, and chromium. In some embodiments, at least 2, 3, 4, 5, 10, 15, 20, 25, 50, 75, 100, 150, 200, 250, or even at least 275 sets of the repeating layers.

11A. The catalyst of any preceding A Exemplary Embodiment, wherein the weight ratio of platinum to chromium is in a range from 6:1 to 140:1 (in some embodiments, in a range from 11:1 to 140:1, in a range from 13:1 to 140:1, in a range from 13:1 to 140:1, in a range from 34:1 to 140:1, in a range from 69:1 to 140:1, in a range from 6:1 to 70:1, in a range from 11:1 to 70:1, in a range from 13:1 to 70:1, in a range from 34:1 to 70:1, in a range from 6:1 to 69:1, in a range from 11:1 to 69:1, in a range from 13:1 to 69:1, in a range from 34:1 to 69:1, in a range from 6:1 to 34:1, in a range from 11:1 to 34:1, and even in a range from 13:1 to 34:1).

12A. The catalyst of any preceding A Exemplary Embodiment, wherein the atomic ratio of platinum to nickel is in a range from 32.5:67.5 to 90.0:10.0 (in some embodiments, in a range from 32.5:67.5 to 80.0:20.0; 32.5:67.5 to 70.0:30.0; 32.5:67.5 to 60.0:40.0; 32.5:67.5 to 50.0: 50.0; 32.5:67.5 to 42.5:57.5; 32.5:67.5 to 40.0:60.0; 32.5: 67.5 to 37.5:62.5; 32.5:67.5 to 35.0:65.0; and even 35.0: 65.0 to 40.0:60.0).

13A. The catalyst of any preceding A Exemplary Embodiment, wherein the catalyst is essentially nonporous.

14A. The catalyst of any preceding A Exemplary Embodiment, wherein the catalyst material has a thickness up to 100 nm (in some embodiments, up to 50 nm, 20 nm, 15 nm, 10 nm, 5 nm, 4 nm, 3 nm, 2 nm, 1 nm, a monolayer (e.g., 0.2 nm), or even up to less than a monolayer (e.g. 0.01 nm); in some embodiments, in a range from 0.01 nm to 100 nm, 0.01 nm to 50 nm, 0.1 nm to 15 nm, 0.1 nm to 10 nm, 0.1 nm to 5 nm, or even 1 nm to 5 nm).

15A. A fuel cell membrane electrode assembly comprising the catalyst of any preceding A Exemplary Embodiment.

16A. The fuel cell membrane electrode assembly of Exemplary Embodiment 15A, wherein the catalyst is an oxygen reduction reaction catalyst.

1B. A method comprising annealing the catalyst of any of Exemplary Embodiments 1A to 14A.

1C. A method of making the catalyst of any of Exemplary Embodiments 1A to 14A, the method comprising depositing platinum and nickel from a target comprising platinum and nickel and depositing chromium from a target comprising chromium.

2C. The method of Exemplary Embodiment 1C, wherein the target is a Pt38Ni62 target.

3C. The method of any preceding C Exemplary Embodiment, wherein layer(s) comprising platinum and nickel each independently have a planar equivalent thickness in a range from 0.2 nm to 100 nm (in some embodiments, in a range from 0.2 nm to 20 nm, or even 0.2 nm to 10 nm) and the layer(s) comprising chromium each independently have a planar equivalent thickness in a range from 0.01 nm to 20 nm (in some embodiments, in a range from 0.01 nm to 10 nm, 0.01 nm to 5 nm, 0.02 nm to 5 nm, 0.02 nm to 1 nm, or even 0.1 nm to 1 nm).

4C. The method of any of preceding C Exemplary Embodiment, further comprising annealing the catalyst.

1D. A method of making the catalyst of any of Exemplary Embodiments 1A to 14A, the method comprising depositing platinum from a target comprising platinum, depositing nickel from a target comprising nickel, and depositing chromium from a target comprising chromium.

2D. The method of Exemplary Embodiment 1D, wherein a layer comprising platinum, an adjacent layer comprising nickel, and an adjacent layer comprising chromium collectively having a planar equivalent thickness in a range from 0.4 nm to 100 nm (in some embodiments, in a range from 1 nm to 100 nm, in a range from 1 nm to 50 nm, in a range from 1 nm to 30 nm, in a range from 2 nm to 50 nm, in a range from 2 nm to 30 nm, in a range from 5 nm to 50 nm, and even in a range from 10 nm to 30 nm.

3D. The method of Exemplary Embodiment 1D, wherein layer(s) comprising platinum each independently have a planar equivalent thickness in a range from 0.2 nm to 50 nm (in some embodiments, in a range from 0.2 nm to 20 nm, or even 0.2 nm to 10 nm), layers comprising nickel each independently have a planar equivalent thickness in a range from 0.2 nm to 100 nm (in some embodiments, in a range from 0.2 nm to 25 nm, or even 0.2 nm to 10 nm) and layer(s) comprising chromium each independently have a planar equivalent thickness in a range from 0.01 nm to 20 nm (in some embodiments, in a range from 0.01 nm to 10 nm, 0.01 nm to 5 nm, 0.02 nm to 5 nm, 0.02 nm to 1 nm, or even 0.1 nm to 1 nm).

4D. The method of any preceding D Exemplary Embodiment, further comprising annealing the catalyst.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Preparatory Example

Microstructured whiskers employed as catalyst supports were made according to the process described in U.S. Pat. No. 5,338,430 (Parsonage et al.), U.S. Pat. No. 4,812,352 (Debe), and U.S. Pat. No. 5,039,561 (Debe), incorporated herein by reference, using as substrates the microstructured catalyst transfer substrates (or MCTS) described in U.S. Pat. No. 6,136,412 (Spiewak et al.), also incorporated herein by reference. Perylene red pigment (i.e., N,N'-di(3,5-xylyl) perylene-3,4:9,10-bis(dicarboximide)) (C.I. Pigment Red 149, also known as "PR149", obtained from Clariant, Charlotte, N.C.) was sublimation vacuum coated onto MCTS with a nominal thickness of 200 nm, after which it was annealed. After deposition and annealing, highly oriented crystal structures were formed with large aspect ratios, controllable lengths of about 0.8 micrometer, widths of about 0.03 micrometer and areal number density of about 50 whiskers per square micrometer, oriented substantially normal to the underlying substrate. The combined surface area of the whiskers and the backing was estimated to be about 5.5 cm$^2$ per cm$^2$ planar substrate area.

Nanostructured thin film (NSTF) catalyst layers were prepared by sputter coating catalyst films sequentially using a DC-magnetron sputtering process onto the layer of microstructured whiskers. A vacuum sputter deposition system was used with typical Ar sputter gas pressures of about 5 mTorr (0.66 Pa), and individual 12.7 cm×38.1 cm (5-inch× 15-inch) rectangular Pt and Ni sputter targets were used. The coatings were deposited by using ultra high purity Ar as the sputtering gas. A single Pt layer with planar equivalent thickness of about 0.25 nm was first deposited onto the whiskers on MCTS from a pure Pt target. Next, a single Ni layer with planar equivalent thickness of about 0.31 nm was deposited from a pure Ni target. The Pt and Ni deposition processes were repeated 50 times, resulting in an areal loading of about 0.028 mg$_{Pt}$/cm$^2$. The targeted individual Pt and Ni layer thicknesses were calculated to yield an overall composition of 35.96 at. % Pt and 64.04 at. % Ni for the combined layers. A total of about 50 linear feet of catalyzed whiskers on MCTS substrate were generated. The targeted composition of the Preparatory Example is listed in Table 1, below.

TABLE 1

| Example | Pt Loading, microg/cm$^2$ | Ni Loading, microg/cm$^2$ | Cr Loading, microg/cm$^2$ | Pt Content, at. % | Ni Content, at. % | Cr Content, at. % | Pt:Cr Weight Ratio |
|---|---|---|---|---|---|---|---|
| Prep. Ex. | 28 | 15 | 0 | 35.96 | 64.04 | 0 | INFINITE |
| Comp. Ex. | | | | | | | |
| 1 | 28 | 15 | 0.1 | 35.79 | 63.73 | 0.48 | 280.0 |
| 2 | 28 | 15 | 0.21 | 35.60 | 63.40 | 1.00 | 133.3 |
| 3 | 28 | 15 | 0.42 | 35.25 | 62.77 | 1.98 | 66.7 |
| 4 | 28 | 15 | 1.1 | 34.15 | 60.81 | 5.03 | 25.5 |
| 5 | 28 | 15 | 1.3 | 33.84 | 60.26 | 5.90 | 21.5 |
| 6 | 28 | 15 | 2.3 | 32.37 | 57.65 | 9.98 | 12.2 |

The Preparatory Example's catalyst material's calculated planar equivalent thicknesses and the thickness of the catalyst material on the whisker support are listed in Table 2, below.

TABLE 2

| Example | Pt and Ni Planar Equivalent Thickness, nm | Cr Planar Equivalent Thickness, nm | Pt and Ni Thickness on Whisker, nm | Cr Thickness on Whisker, nm |
|---|---|---|---|---|
| Prep. Ex. | 29.91 | 0.00 | 5.44 | 0.00 |
| Comp. Ex. | 29.91 | 0.00 | 5.44 | 0.00 |
| 1 | 29.91 | 0.14 | 5.44 | 0.03 |
| 2 | 29.91 | 0.29 | 5.44 | 0.05 |
| 3 | 29.91 | 0.58 | 5.44 | 0.11 |
| 4 | 29.91 | 1.53 | 5.44 | 0.28 |
| 5 | 29.91 | 1.81 | 5.44 | 0.33 |
| 6 | 29.91 | 3.20 | 5.44 | 0.58 |

The total planar equivalent thicknesses of the Pt and Ni deposited was 29.91 nm. When deposited onto the whisker-coated baking, the total Pt and Ni thickness on the support was 5.44 nm, 5.5 times less than the planar equivalent thickness.

Representative areas of the electrocatalyst were analyzed for bulk composition using X-Ray Fluorescence spectroscopy (XRF). Representative catalyst samples were evaluated on MCTS using a wavelength dispersive X-ray fluorescence spectrometer (obtained under the trade designation "PRIMUS II" from Rigaku Corporation, Tokyo, Japan) equipped with a rhodium (Rh) X-ray source, a vacuum atmosphere, and a 20-mm diameter measurement area. Each sample was analyzed three times to obtain the average and standard deviation for the measured Pt and Ni signal intensities, which are proportional to loading. The electrocatalyst's Pt and Ni loadings were determined by comparing their measured XRF intensities to the XRF intensities obtained with standard NSTF electrocatalysts containing Pt and Ni with known areal loadings. From the XRF-determined Pt and Ni loading, the catalyst's Pt content (at. % Pt) was calculated, based on the Pt and Ni loadings only. Loading and composition information is provided in Table 3, below.

TABLE 3

| Example | Pt Loading, microg/cm$^2$ | Ni Loading, microg/cm$^2$ | Pt Content, at. % | Ni Content, at. % |
|---|---|---|---|---|
| Prep. Ex. Comp. Ex. | 27.85 | 14.97 | 35.89 | 64.11 |

The Pt content of the Preparatory Example was 35.89 at. % and the Ni content was 64.11 at. %.

The Preparatory Example material was used as input material for the Comparative Example and Examples 1-6, described below.

Comparative Example

The Comparative Example consisted of the Preparatory Example, without any additional deposition. Typically, two or more nominally identical electrocatalyst samples of a given type were fabricated and characterized as described below.

The Preparatory Example electrocatalyst was thermally annealed. Electrocatalyst on MCTS was placed into a quartz tube furnace (obtained under the trade designation "LINDBERG BLUE M" from Thermo Electron Corporation, Waltham, Mass.) and heated to 340° C. under flowing $H_2$. After about a 20-minute temperature ramp, the catalyst was annealed for about 0.5 hour at temperature, and then allowed to cool to room temperature over about a 3-hour period. After cooling to room temperature, the tube furnace was purged with nitrogen for about 15 minutes to remove any remaining $H_2$, after which the catalyst on the substrate was removed from the furnace.

Without being bound by theory, annealed PtNi electrocatalyst with this composition and loading on NSTF supports is structurally and compositionally homogenous, composed of fused nanoscopic catalyst particles, with an approximate electrocatalyst thickness on the support whisker less than 10 nm.

The Comparative Example catalyst and NSTF PtCoMn coated anode catalyst whiskers (0.05 mp$_{Pt}$/cm$^2$, Pt$_{69}$Co$_{28}$Mn$_3$) on MCTS were then transferred to either side of a 24-micrometer thick proton exchange membrane (obtained under the trade designation "3M PFSA 825EW"

(neat) from 3M Company, St. Paul, Minn.), using a laminator (obtained under the trade designation "HL-101" from ChemInstruments, Inc., West Chester Township, Ohio) to form a catalyst coated membrane (CCM). The three-layer stack-up was hand fed into the laminator with hot nip rolls at 270° F. (132° C.), 150 psi (1.03 MPa) nip, and rotating at the equivalent of 0.5 fpm (0.25 cm/s). Immediately after lamination, the MCTS layers were peeled back, leaving the catalyst coated whiskers embedded into either side of the PEM. The CCM was installed with identical gas diffusion layers (obtained under the trade designation "3M 2979 GAS DIFFUSION LAYERS" from 3M Company) on the anode and cathode in 50 cm$^2$ active area test cells (obtained under the trade designation "50 CM$^2$ CELL HARDWARE" from Fuel Cell Technologies, Inc., Albuquerque, N.M.) with quad-serpentine flow fields with gaskets selected to give 10% compression of the gas diffusion layers. The Comparative Example catalyst was evaluated as the fuel cell cathode.

After assembly, the test cells were connected to a test station (obtained under the trade designation "SINGLE FUEL CELL TEST STATION" from Fuel Cell Technologies, Inc.). The MEA was then operated for about 40 hours under a conditioning protocol to achieve apparent steady state performance. The protocol consisted of repeated cycles of operational and shutdown phases, each about 40 and 45 minutes in duration, respectively. In the operational phase, the MEA was operated at 75° C. cell temperature, 70° C. dewpoint, 101/101 kPaA $H_2$/Air, with constant flow rates of 800 and 1800 standard cubic centimeters per minute (sccm) of $H_2$ and air, respectively. During the 40-minute operational phase, the cell voltage was alternated between 5-minute-long polarization cycles between 0.85 V and 0.25 V and 5-minute-long potential holds at 0.40 V. During the 45-minute shutdown phase, the cell potential was set to open circuit voltage, $H_2$ and air flows to the cell were halted, and the cell temperature was cooled towards room temperature while liquid water was injected into the anode and cathode cell inlets at 0.26 g/min. and 0.40 g/min., respectively.

After conditioning the MEAs, the electrocatalysts were characterized for relevant beginning of life (BOL) characteristics, including catalyst mass activity, specific surface area, specific activity, and operational performance under relevant $H_2$/Air test conditions, described as follows.

Figure 3:
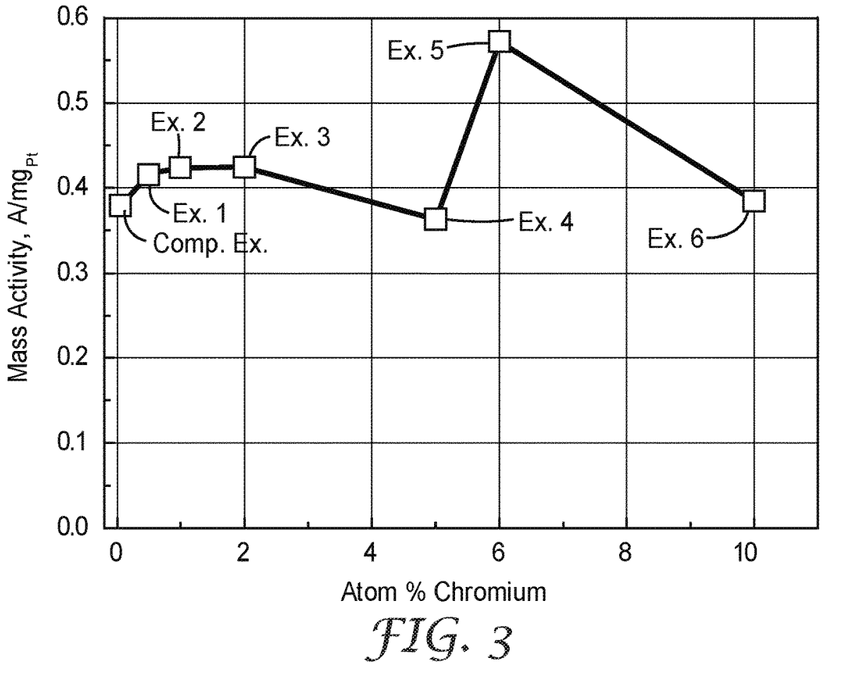
FIG. 3 is a plot of the electrocatalyst mass activity of Examples 1-6 and the Comparative Example catalysts, normalized to platinum content.

The cathode oxygen reduction reaction (ORR) absolute activity was measured with saturated 150 kPaA $H_2$/$O_2$, 80° C. cell temperature for 1200 seconds at 900 mV vs. the 100% $H_2$ reference/counter electrode. The ORR absolute activity (A/cm$^2$ or mA/cm$^2$) was obtained by adding the measured current density after 1050 seconds of hold time and the electronic shorting and hydrogen crossover current densities, estimated from 2 mV/s cyclic voltammograms measured with $N_2$ fed to the working electrode instead of $O_2$. The electrocatalyst mass activity, a measure of the catalyst activity per unit precious metal content, is calculated by dividing the corrected ORR absolute activity (A/cm$^2_{planar}$) by the cathode Pt areal loading (mg/cm$^2$) to obtain the mass activity (A/mg$_{Pt}$). The mass activity of the Comparative Example is plotted in FIG. 3 and listed in Table 4, below.

TABLE 4

| Example | Cr Content, at. % | Samples Evaluated | Mass Activity, A/mg$_{Pt}$ | | Specific Area, m$^2_{Pt}$/g$_{Pt}$ | | Specific Activity, mA/cm$^2_{Pt}$ | |
|---|---|---|---|---|---|---|---|---|
| | | | Mean | Std. Dev. | Mean | Std. Dev. | Mean | Std. Dev. |
| Comp. Ex. | 0.00 | 3 | 0.38 | 0.05 | 17.6 | 0.4 | 2.17 | 0.25 |
| 1 | 0.48 | 2 | 0.42 | 0.09 | 18.6 | — | 2.57 | — |

TABLE 4-continued

| Example | Cr Content, at. % | Samples Evaluated | Mass Activity, A/mg$_{Pt}$ | | Specific Area, m$^2$$_{Pt}$/g$_{Pt}$ | | Specific Activity, mA/cm$^2$$_{Pt}$ | |
|---|---|---|---|---|---|---|---|---|
| | | | Mean | Std. Dev. | Mean | Std. Dev. | Mean | Std. Dev. |
| 2 | 1.00 | 2 | 0.43 | 0.05 | 18.4 | 0.5 | 2.32 | 0.35 |
| 3 | 1.98 | 2 | 0.43 | 0.08 | 18.9 | 0.7 | 2.25 | 0.35 |
| 4 | 5.03 | 2 | 0.36 | 0.05 | 18.8 | 0.4 | 1.93 | 0.24 |
| 5 | 5.90 | 2 | 0.58 | 0.03 | 19.5 | 0.6 | 2.96 | 0.24 |
| 6 | 9.98 | 2 | 0.39 | 0.02 | 18.2 | 2.2 | 2.13 | 0.13 |

The cathode catalyst surface enhancement factor (SEF, m$^2$$_{Pt}$/m$^2$$_{planar}$ or analogously cm$^2$$_{Pt}$/cm$^2$$_{planar}$) was measured via cyclic voltammetry (100 mV/s, 0.65 V-0.85 V, average of 100 scans) under saturated 101 kilopascals absolute pressure (kPaA) H$_2$/N$_2$ and 70° C. cell temperature. The SEF was estimated by taking the average of the integrated hydrogen underpotential deposition (H$_{UPD}$) charge (μC/cm$^2$$_{planar}$) for the oxidative and reductive waves and dividing by 220 microC/cm$^2$$_{Pt}$. The electrocatalyst's specific surface area (m$^2$$_{Pt}$/g$_{Pt}$), a measure of catalyst dispersion, was calculated by dividing the SEF (m$^2$$_{Pt}$/m$^3$$_{planar}$) by the areal Pt loading (g$_{Pt}$/m$^2$$_{planar}$). The specific area is plotted in FIG. 4 and reported in Table 4, above.

The cathode catalyst oxygen reduction specific activity was calculated by dividing the corrected ORR absolute activity (A/cm$^2$$_{planar}$) by the SEF (cm$^2$$_{Pt}$/cm$^2$$_{planar}$) to obtain the specific activity expressed in (A/cm$^2$$_{Pt}$), or after unit conversion as mA/cm$^2$$_{Pt}$ (multiply (A/cm$^2$) by 1000 mA per A). The specific activity is plotted in FIG. 5 and is reported in Table 4, above. The specific activity is a measure of catalyst activity per unit catalyst surface area, a measure of fundamental catalyst activity.

After activities and surface area characterizations were complete, the H2/Air performance of the MEA was measured. MEAs were operated at 80° C. cell temperature, with the cathode exposed to air (68° C. dewpoint, 150 kPaA, constant stoichiometry 2.5) and anode exposed to H$_2$ (68° C. dewpoint, 150 kPaA, constant stoichiometry 2.0). The MEA current density (J) was stepwise incremented up from 0.02 A/cm$^2$ until the cell voltage reached 0.50 V, or J reached 2 A/cm$^2$, at which point the scan was reversed. J steps were spaced at 10 per decade and 0.1 A/cm$^2$. Polarization data was collected at ~1 Hz with a 120 second dwell time at each J. The average of all datapoints at each J setpoint from the high-to-low current portion of the polarization curve were generated. The average cell voltage at 0.02 A/cm$^2$ and 0.32 A/cm$^2$ and the average current density at 0.50 V are listed in Table 5, below. The average cell voltage at 0.32 A/cm$^2$ is plotted in FIG. 6. The Comparative Example's cell voltages at 0.02 A/cm$^2$ and 0.32 A/cm$^2$ were 0.854±0.001V and 0.744±0.004V, respectively, and the current density at 0.50 V cell voltage was 1.09 A/cm$^2$.

TABLE 5

| Example | Cr Content, at. % | Samples Evaluated | Cell Voltage at 0.02 A/cm$^2$, volt | | Cell Voltage at 0.32 A/cm$^2$, volt | | Cell Current Density at 0.50 V, A/cm$^2$ | |
|---|---|---|---|---|---|---|---|---|
| | | | Mean | Std. Dev. | Mean | Std. Dev. | Mean | Std. Dev. |
| Comp. Ex. | 0.00 | 3 | 0.854 | 0.001 | 0.744 | 0.004 | 1.09 | 0.04 |
| 1 | 0.48 | 2 | 0.853 | 0.004 | 0.745 | 0.002 | 1.17 | 0.01 |
| 2 | 1.00 | 1 | 0.861 | — | 0.751 | — | 1.21 | — |
| 3 | 1.98 | 2 | 0.857 | 0.002 | 0.744 | 0.005 | 1.14 | 0.04 |
| 4 | 5.03 | 2 | 0.857 | 0.002 | 0.749 | 0.001 | 1.19 | 0.03 |
| 5 | 5.90 | 2 | 0.861 | 0.001 | 0.755 | 0.000 | 1.18 | 0.00 |
| 6 | 9.98 | 1 | 0.843 | — | 0.730 | — | 1.06 | — |

Example 1

Example 1 catalyst was prepared and characterized similarly to the Comparative Example, except that prior to thermal annealing, chromium was deposited onto the surface of the Preparatory Example catalyst and additional XRF characterization was conducted to estimate the chromium content. Additionally, the durability of Example 1 was not measured.

A vacuum sputter deposition system was used to deposit chromium with typical Ar sputter gas pressures of about 5 mTorr (0.66 Pa), and an individual 12.7 cm×38.1 cm (5-inch×15-inch) rectangular Cr sputter target. Prior to sputter depositing chromium onto the Preparatory Example catalyst, gravimetric calibration of the chromium sputter deposition was conducted to determine areal chromium loadings as a function of target power at fixed web speed. Table 6, below, summarizes the calibration data generated, and this data was used to estimate deposition conditions (target power, web speed, and number of passes) needed to deposit specific areal loadings of chromium.

TABLE 6

| Sample ID | Power, kW | Speed, mpm (fpm) | No. Passes | Average Load, microg/cm$^2$ | Loading Standard Deviation, microg/cm$^2$ |
|---|---|---|---|---|---|
| Calib. 1 | 0.25 | 18.3 (60) | 50 | 9.5 | 6.9 |
| Calib. 2 | 0.50 | 18.3 (60) | 50 | 17.3 | 1.0 |
| Calib. 3 | 1.00 | 18.3 (60) | 50 | 29.1 | 2.7 |
| Calib. 4 | 1.50 | 18.3 (60) | 50 | 44.3 | 1.3 |

Using the Table 6 calibration data, deposition conditions were determined which would result in 0.1 microgram/cm$^2$ chromium. A 2-lineal foot section of the Preparatory Example catalyst was loaded into the sputter system, and chromium coating was deposited by using ultra high purity Ar as the sputtering gas. The Example 1 catalyst's composition, based on the targeted Pt, Ni, and Cr areal loadings, is summarized in Table 1, above. The Example 1 targeted catalyst composition was 35.79 at. % Pt, 63.73 at. % Ni, and 0.48 at. % Cr. The Example 1 catalyst's calculated planar equivalent thicknesses and thicknesses on the support are summarized in Table 2, above. The total planar equivalent thicknesses of the Pt and Ni deposited was 29.91 nm and the total planar equivalent thickness of Cr deposited was 0.14 nm. When deposited onto the whisker-coated baking, the total Pt and Ni thickness on the support was 5.44 nm and the total Cr thickness on the support was 0.03 nm.

After Cr deposition, the catalyst was thermally annealed and characterized similarly to the Comparative Example. The catalyst's mass activity, specific area, and specific activity are listed in Table 4, above, and plotted in FIGS. 3, 4, and 5, respectively. The catalyst's average cell voltage at 0.02 and 0.32 A/cm$^2$ and current density at 0.50 V is listed in Table 5 above, and average cell voltage at 0.32A/cm$^2$ is shown in FIG. 6.

Examples 2-6

Figure 4:
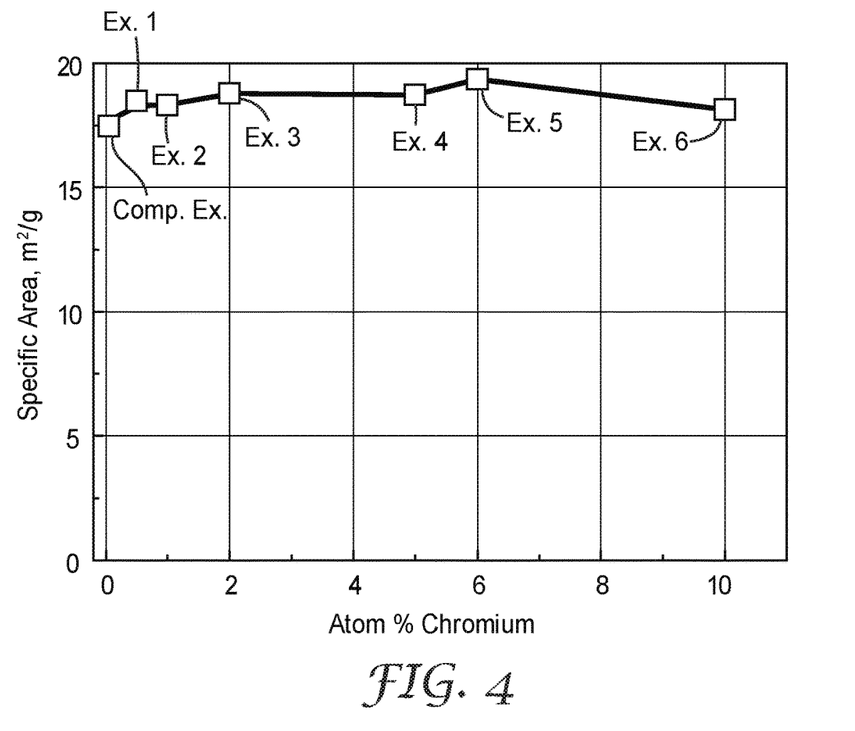
FIG. 4 is a plot of the electrocatalyst surface area of Examples 1-6 and the Comparative Example catalysts, normalized to platinum content.

Examples 2-6 catalysts were prepared and characterized similarly to Example 1, but the chromium deposition conditions were modified. The targeted chromium areal loadings were 0.21, 0.42, 1.1, 1.3, and 2.3 microgram/cm$^2$ for Examples 2-6, respectively. The catalysts composition, based on the targeted Pt, Ni, and Cr areal loadings, is summarized in Table 1, above. The targeted catalyst composition for Example 2-6 were, respectively, 35.60, 35.25, 34.15, 33.84, and 32.37 at. % Pt, 63.73, 63.40, 62.77, 60.81, 60.26, and 57.65 at. % Ni, and 0.48, 1.00, 1.98, 5.03, 5.90, and 9.98 at. % chromium. The catalysts' planar equivalent thicknesses and thickness on the whisker support are listed in Table 2, above. The catalysts' mass activities, specific areas, and specific activities are listed in Table 3, above, and plotted in FIG. 4, FIG. 5, and FIG. 6, respectively. The catalysts' cell voltages at 0.02 and 0.32 A/cm$^2$ and current density at 0.50 V are listed in Table 5, above, and average cell voltages at 0.32 A/cm$^2$ are shown in FIG. 6.
Results FIG. 3 and Table 4, above, summarize the measured mass activity for the Comparative Example and Examples 1-6. The mass activity of the Comparative Example was 0.38±0.05 A/mg. The mass activities of Examples 1-6 were 0.42±0.09, 0.43±0.05, 0.43±0.08, 0.36±0.05, 0.58±0.03, and 0.39±0.02 A/mg, respectively. The mass activities of Examples 1, 2, 3, 5, and 6, with targeted Cr contents of 0.48, 1.00, 1.98, 5.90, and 9.98 at. % were higher than the Comparative Example which did not contain Cr. FIG. 4 and Table 4, above, summarize the specific surface area of the Comparative Example and Examples 1-6. The specific area of the Comparative Example was 17.6±0.4 m$^2$/g. The specific areas of Examples 1-6 were 18.6, 18.4±0.5, 18.9±0.7, 18.8±0.4, 19.5±0.6, and 18.2±2.2 m$^2$/g. The specific surface areas of Examples 1-6 were higher than the Comparative Example.

Figure 5:
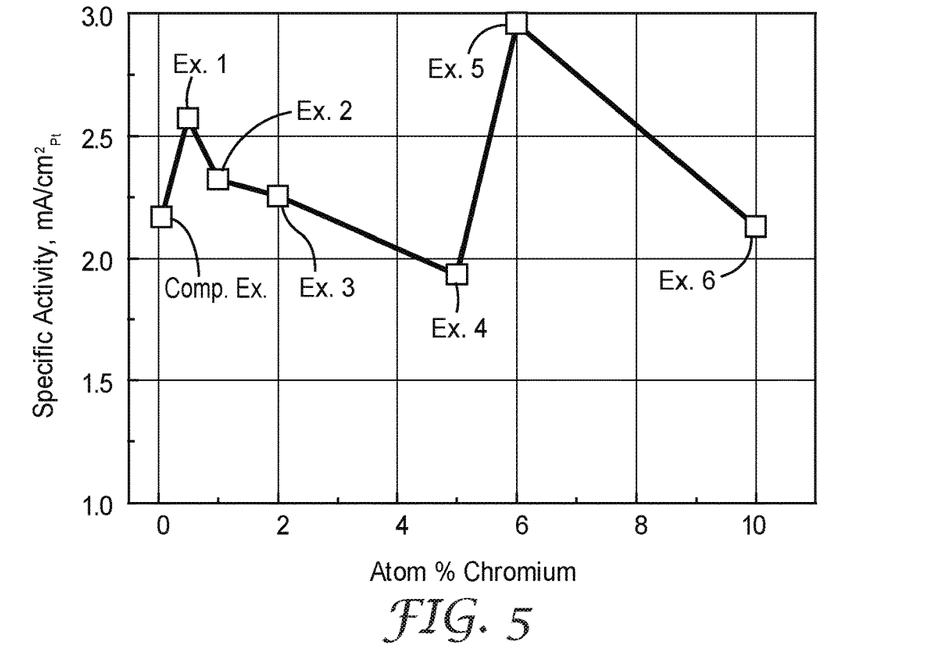
FIG. 5 is a plot of the electrocatalyst specific activity of Examples 1-6 and the Comparative Example catalysts, normalized to Pt surface area.
Figure 6:
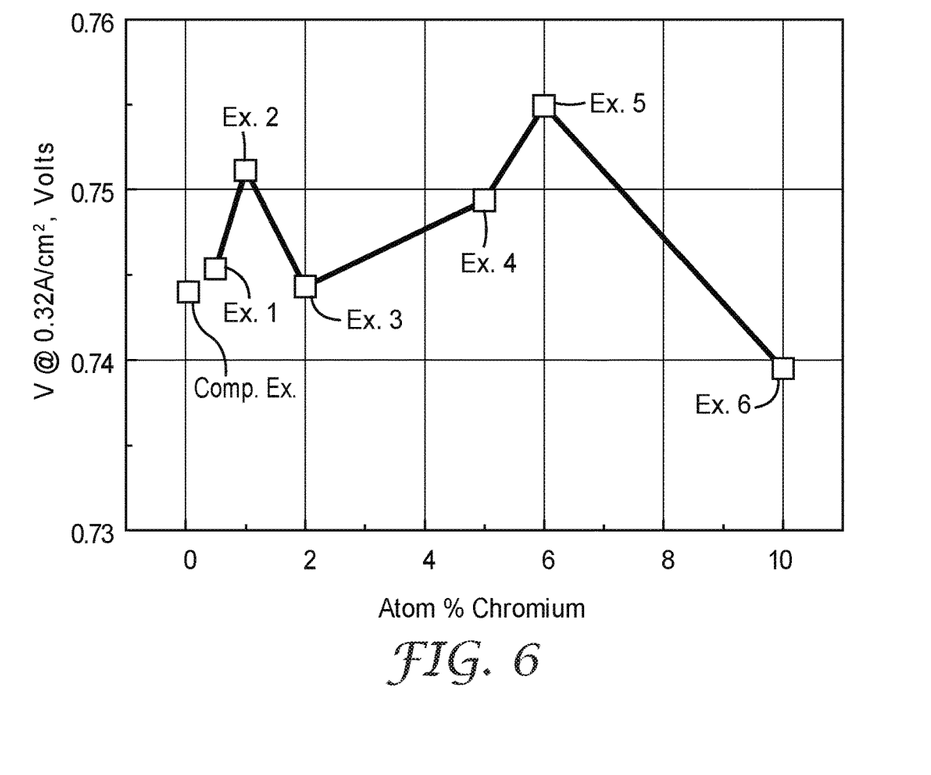
FIG. 6 is a plot of the electrocatalyst cell voltage of Examples 1-6 and the Comparative Example catalysts, at 0.32 A/cm$^2$ cell current density.

FIG. 5 and Table 4, above, summarize the measured specific activity of the Comparative Example and Examples 1-6. The specific activities of the Comparative Example were 2.17±0.25 mA/cm$^2_{Pt}$. The specific activities of Examples 1-6 were 2.17±0.25, 2.57, 2.32±0.35, 2.25±0.35, 1.93±0.24, 2.96±0.24, and 2.13±0.13 mA/cm$^2_{Pt}$, respectively. The specific activities of Examples 1, 2, 3, and 5 with 0.48, 1.00, 1.98, 5.90 at. % Cr, were higher than the specific activity of the Comparative Example which did not contain Cr.

Table 5, above, summarizes the measured cell voltage at 0.02 A/cm$^2$ of the Comparative Example and Examples 1-6. The cell voltage at 0.02 A/cm$^2$ of the Comparative Example was 0.854±0.001 V. The cell voltage at 0.02 A/cm$^2$ of Examples 1-6 were 0.853±0.004, 0.861, 0.857±0.002, 0.857±0.002, 0.861±0.001, and 0.843 V, respectively. The cell voltage at 0.02A/cm$^2$ of Examples 2, 3, 4, and 5 with 1.00, 1.98, 5.03, and 5.90 at. % Cr were higher than the cell voltage of the Comparative Example which did not contain Cr.

FIG. 6 and Table 5, above, summarize the measured cell voltage at 0.32 A/cm$^2$ of the Comparative Example and Examples 1-6. The cell voltage at 0.32 A/cm$^2$ of the Comparative Example was 0.744±0.004 V. The cell voltage at 0.32 A/cm$^2$ of Examples 1-6 were 0.745±0.002, 0.751, 0.744±0.005, 0.749±0.001, 0.755±0.000, and 0.730 V, respectively. The cell voltage at 0.32A/cm$^2$ of Examples 1, 2, 4 and 5 with 0.48, 1.00, 5.03, and 5.90 at. % Cr were higher than the cell voltage of the Comparative Example which did not contain Cr.

Table 5, above, summarizes the measured cell current density at 0.50 V of the Comparative Example and Examples 1-6. The cell current density at 0.50 V of the Comparative Example was 1.09±0.04 A/cm$^2$. The cell current density at 0.50 V of Examples 1-6 were 1.17±0.01, 1.21, 1.14±0.04, 1.19±0.03, 1.18±0.00, and 1.06 A/cm$^2$, respectively. The cell current density at 0.50 V of Examples 1-5 with 0.48, 1.00, 1.98, 5.03, and 5.90 at. % Cr were higher than the current density of the Comparative Example which did not contain Cr.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A catalyst comprising nanostructured elements comprising microstructured whiskers having an outer surface at least partially covered by a catalyst material comprising at least 90 atomic percent collectively Pt, Ni, and Cr, wherein, when considering only the collective Pt, Ni, and Cr, the Pt is present in a range from 32.4 to 35.8 atomic percent, the Ni is present in a range from 57.7 to 63.7 atomic percent, and the Cr is present in a range from 0.5 to 10.0 atomic percent, and wherein the total atomic percent of the collective Pt, Ni, and Cr equals 100, wherein the catalyst has an exposed surface layer and the exposed surface layer is a sub-monolayer of chromium.

2. The catalyst of claim 1, wherein the Pt is present in a range from 33.8 to 35.8 atomic percent, the Ni is present in a range from 60.3 to 63.7 atomic percent, and the Cr is present in a range from 0.5 to 5.9 atomic percent of the collective Pt, Ni, and Cr.

3. The catalyst of claim 1, wherein the catalyst material comprises a layer comprising platinum and nickel and a layer comprising chromium on the layer comprising platinum and nickel.

4. The catalyst of claim 3, wherein each layer independently has a planar equivalent thickness up to 25 nm.

5. The catalyst of claim 1, wherein the catalyst material comprises alternating layers comprising platinum and nickel and layers comprising chromium.

6. The catalyst of claim 5, wherein each layer independently has a planar equivalent thickness up to 25 nm.

7. The catalyst of claim 1, wherein the catalyst material comprises a layer comprising platinum, a layer comprising nickel on the layer comprising platinum, and a layer comprising chromium on the layer comprising nickel.

8. The catalyst of claim 1, wherein the catalyst material comprises a layer comprising nickel, a layer comprising platinum on the layer comprising nickel, and a layer comprising chromium on the layer comprising platinum.

9. The catalyst of claim 1, wherein the weight ratio of platinum to chromium is in a range from 6:1 to 140:1.

10. The catalyst of claim 1, wherein the catalyst material has a thickness in a range from 0.1 to 15 nm.

11. A fuel cell membrane electrode assembly comprising the catalyst of claim 1.

12. A method comprising annealing the catalyst of claim 1.

13. A method of making the catalyst of claim 1, the method comprising depositing platinum and nickel from a target comprising platinum and nickel and depositing chromium from a target comprising chromium.

\* \* \* \* \*